(12) United States Patent
Gustafson et al.

(10) Patent No.: US 8,503,015 B2
(45) Date of Patent: Aug. 6, 2013

(54) MULTIPRODUCT PRINTING WORKFLOW SYSTEM WITH DYNAMIC CADENCE

(75) Inventors: Mark W. Gustafson, Spokane, WA (US); Robert Mitchell, Kirkland, WA (US)

(73) Assignee: Reischling Press, Inc., Tukwila, WA (US)

( * ) Notice: Subject to any disclaimer, the term of this patent is extended or adjusted under 35 U.S.C. 154(b) by 728 days.

(21) Appl. No.: 12/758,527

(22) Filed: Apr. 12, 2010

(65) Prior Publication Data

US 2010/0195155 A1    Aug. 5, 2010

Related U.S. Application Data

(63) Continuation-in-part of application No. 12/011,169, filed on Jan. 23, 2008, now Pat. No. 8,310,696.

(51) Int. Cl.
*G06F 3/12* (2006.01)
*G06K 15/00* (2006.01)

(52) U.S. Cl.
USPC .................. 358/1.15; 358/1.13; 358/1.16

(58) Field of Classification Search
None
See application file for complete search history.

(56) References Cited

U.S. PATENT DOCUMENTS 5,287,194 A * 2/1994 Lobiondo ............... 358/296
2012/0062933 A1 * 3/2012 Zeng et al. ............. 358/1.15

OTHER PUBLICATIONS

Donald Gross, et al., Fundamentals of Queueing Theory, Third Edition, 1998, pp. 10-12, 60-65, John Wiley & Sons, Inc., U.S. and Canada.

* cited by examiner

*Primary Examiner* — Dov Popovici
(74) *Attorney, Agent, or Firm* — Soquel Group, LLC

(57) ABSTRACT

A method and system for managing print jobs in a printing system, including assigning one or more printing resources including at least one printer to a print value stream, the print value stream capable of printing one or more parts from one or more print products, maintaining a prioritized queue of print jobs to be processed by the print value stream, dynamically updating a cadence rate that indicates the maximum number of print units to be printed by the print value stream during a specified period of time, and providing the print jobs from the prioritized queue in priority order to the print value stream at a rate so as not to exceed the cadence rate. The approach is related in principle to Takt Time or Taktzeit.

17 Claims, 23 Drawing Sheets

MULTIPRODUCT PRINTING WORKFLOW SYSTEM WITH DYNAMIC CADENCE

PRIORITY CLAIM

This is a Continuation-in-Part of U.S. patent application Ser. No. 12/011,169 filed Jan. 23, 2008 which should be incorporated by reference in the present application.

FIELD OF THE INVENTION

The present invention relates to a commercial printing system that provides dynamically updated scheduling so as to meet service level agreement requirements.

BACKGROUND OF THE INVENTION

Popular web sites now enable customers to create and order a variety of personalized print products, including inter alia calendars, greetings cards, notepads, and photo books. Customers insert their own text and photos within templates provided on the web sites and in retail stores, and fulfillers print the resulting photo products. Such web sites include www.snapfish.com operated by Hewlett-Packard Company of Palo Alto, Calif., www.shutterfly.com operated by Shutterfly, Inc. of Redwood City, Calif. and www.blurb.com operated by Blurb, Inc. of San Francisco, Calif. Such retailers include Walmart and Walgreens.

Orders for personalized print products typically involve low quantities. Often customers order only a single copy of a book or calendar. As such, a fulfiller must be able to print and manage a very large number of very small jobs. Moreover, the jobs themselves often include a variety of component parts. For example, a book generally includes a dust cover, a spine and the pages themselves.

Managing and monitoring orders for large numbers of personalized print products as they proceed through a print workflow moving from prepress to press to postpress is very complex. Such complexity stems from many factors, including job ingest, job scheduling, coordination of physical component print parts on the shop floor, product dispatch, inventory control, machine maintenance, failover protection, product defects, customer returns, irregular seasonal volume, and much more.

Conventional short run printing systems enable printing of small quantities of a document. Conventional variable data printing systems enable changes in text on a per document basis. For example, multiple copies of a letter can be printed, and a name can be changed for each copy.

However, conventional printing systems are not optimized for the complexity of the massive volume and diversity of small individual print jobs characterized by online printing systems that cater to consumers and small businesses. There is thus a need for a method and system to efficiently manage and monitor the fulfillment printing workflow, in order to guarantee that an order consisting of a plurality of print products is printed, bound and shipped within a prescribed deadline.

It has been found advantageous to synchronize the rate of output, or cadence, of certain steps of the printing workflow with subsequent workflow steps that utilize the output. For example, it is often advantageous to synchronize the rate of print jobs that are provided to a printing press with the rate at which a finishing system can perform finishing processes such as binding, and packaging. Such synchronization aims to avoid having print jobs mount up on the shop floor. While lean manufacturing processes that manage an output rate have been used in industrial manufacturing they have not been applied in modern digital printing systems.

SUMMARY OF THE DESCRIPTION

The present invention concerns a system and method for monitoring and controlling an end-to-end printing workflow for printing a wide diversity of variable length short run personalized print products. The end-to-end printing workflow includes (i) prepress stages that ingest customer print orders for books, greetings cards, playing cards, notepads, stationary, stickers, calendars, magnets, and other such merchandise, and generate a series of print jobs therefrom; (ii) raster image processing and print stages that rasterize the print jobs and print them on appropriate printers; and (iii) postpress stages that gather and bind various product parts, package them, and prepare them for shipping to customers.

In accordance with an embodiment of the present invention, customer orders are transmitted to a printing system via partners, such as web sites and retail stores. The printing system has an agreement with each partner, referred to as a service level agreement (SLA), which stipulates the terms and conditions of the service provided by the printing system to the partner. Terms of the SLA include legal terms such as indemnifications, and pricing terms. In addition, the SLA includes a maximum time delay from the time a customer order is entered into the printing system until the order is finished and ready for shipping.

In accordance with an embodiment of the present invention, the end-to-end printing workflow is represented as a plurality of processing states through which a print order advances as it moves through the printing system. An order serializer decomposes printer orders into a plurality of work items. A work scheduler assigns priorities to each work item waiting in queue at a processing state, and the work item with the highest priority is processed first. The work scheduler assigns priorities in such a way that each print job is finished within the deadline prescribed by the SLA with the partner that transmitted the print job. Furthermore, the work scheduler assigns priorities in such a way as to maximize efficiency and profitability. Some print jobs include multiple parts, such as a book that includes a cover, a spine and book pages, and the work scheduler assigns priorities to parts in an intelligent way so that all parts of a print product are ready for postpress processing in time to be finished within the deadline.

In accordance with an embodiment of the present invention, work items are lotted; i.e., combined in a single lot or print job, for printing together. Additionally, work items are imposed so that multiple surfaces are printed on a single large sheet of paper. In a business environment typified by many diverse small print orders, imposition and lotting achieve efficiency in avoiding wastage of paper, efficiency in use of printers and other resources, and efficiency in timely completion of print orders.

In accordance with another embodiment of the present invention, one or more printing resources including at least one printer are assigned to a print value stream, said print value stream capable of printing one or more parts from one or more print products. A prioritized queue of print jobs to be processed by the print value stream is maintained, each print job including at least one part to be printed from at least one print product. A cadence rate that indicates the desired number of print units to be printed by said print value stream during a cycle, said cycle being a specified period of time, is dynamically updated, and the print jobs from the prioritized queue are provided in priority order to the print value stream at a rate so as not to exceed the cadence rate.

BRIEF DESCRIPTION OF THE DRAWINGS

The subject invention will be more fully understood and appreciated from the following detailed description, taken in conjunction with the drawings in which.

DETAILED DESCRIPTION

Figure 1:
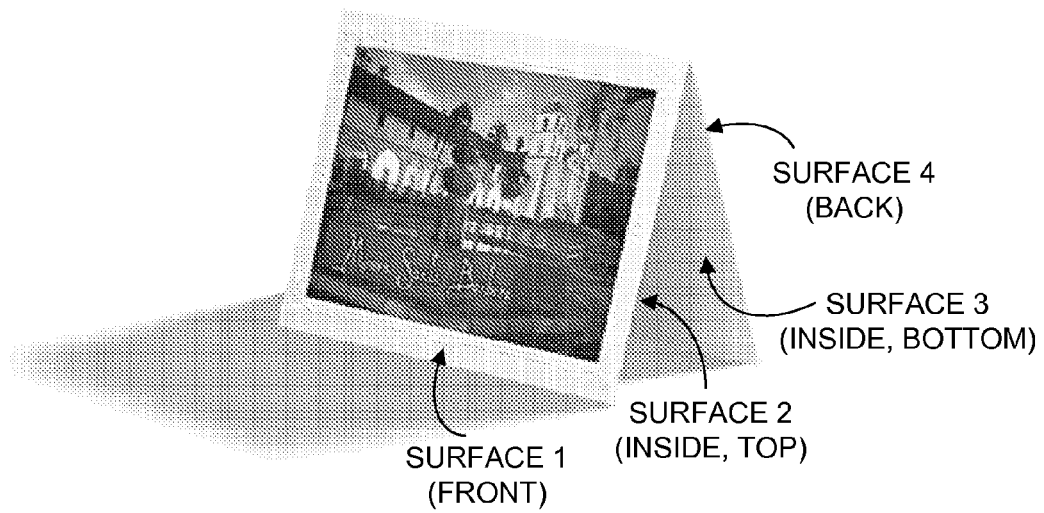
FIG. 1 is a depiction of a greeting card with four surfaces, in accordance with an embodiment of the subject invention.

The present invention concerns a printing system that accepts orders from business partners and manages a print workflow to enable the printing system to meet service level agreements (SLAs). The printing system is operated by a printing system provider. Print orders flow into the system from one or more partners, where a partner is a company or organization that operates a system, referred to as a "partner system," that receives print orders from retail customers. The partner system can be inter alia a web-based system or a retail store. For each partner there is a service level agreement ("SLA") between the printing system provider and the partner that defines inter alia the products that the printing system can accept and print, and the maximum delay to be incurred in printing each product. The present invention relates to the ability of the printing system to meet the SLA-defined maximum delay requirements.

For purposes of clarity, a print order, or simply an "order," includes one or more copies of one or more print products. An order is equivalent to a shopping cart in an ecommerce system. The order can have multiple line items where each line item designates a unique product to be printed. In addition, an order may include one or more embellishments. An embellishment is an item, such as a coupon, that may not be explicitly ordered by a retail customer but which is added to one or more of the packages shipped to the recipient of the order. Embellishments may include inter alia a coupon, a free sample, or promotional literature. A maximum allowed delay incurred in printing a product, referred to as "Max_Delay," is defined as an upper limit on the amount of time spent from the moment that a print order for a printed product is accepted into the print system until the moment the printed product is picked up by a shipping service. The Max_Delay includes the time to perform various prepress steps, then to raster image process ("RIP") and print the document, and then to finish the document. The finishing process includes binding, packaging and printing a packing slip and a mailing label.

A line item, also known as a stock keeping unit (SKU) or a part, refers to a single product. Example line items include photo books, notepads, and greeting cards. A line item has attributes including inter alia a quantity and a number of pages. A line item with quantity greater than one, i.e., multiple copies of the same product, can be shipped to multiple recipients. For example, if four copies of a calendar are printed, three may be shipped to one recipient and one to a different recipient. A line item is composed of one or more "material parts." For example, a photo book consists of a cover, a spine and book pages, referred to as "book block". Each of the components (e.g. cover, spine, book block) of a line item or product is referred to as a "material part." Some material parts are printed items, e.g. greetings cards and calendars; other material parts are non-printed items such as a velum separator page or a red cover.

Reference is now made to FIG. 1 which is a depiction of a greeting card with four surfaces, in accordance with an embodiment of the subject invention. Generally, each product to be printed consists of one or more "surfaces" where a surface is defined as a printed side of a page. For example, a page in a photo book has two surfaces, front and back, while a greeting card has four surfaces. Thus the greeting card illustrated in FIG. 1 has four surfaces; namely, front, inside top, inside bottom, and back.

In one embodiment, one digital image, referred to as a "composite image" or "composite," is stored by the partner for each surface. The composite image exactly represents the surface to be printed. The use of composite images between the partner and the printing system allows the printing system to provide WYSIWG (what you see is what you get) printing. In other words, the document that the customer sees on their display appears identical to the printed product that they receive in the mail. In order to achieve WYSIWG printing, the composite is typically an image that covers the entire surface and that is reproduced as precisely as possible by the subject invention.

Figure 2:
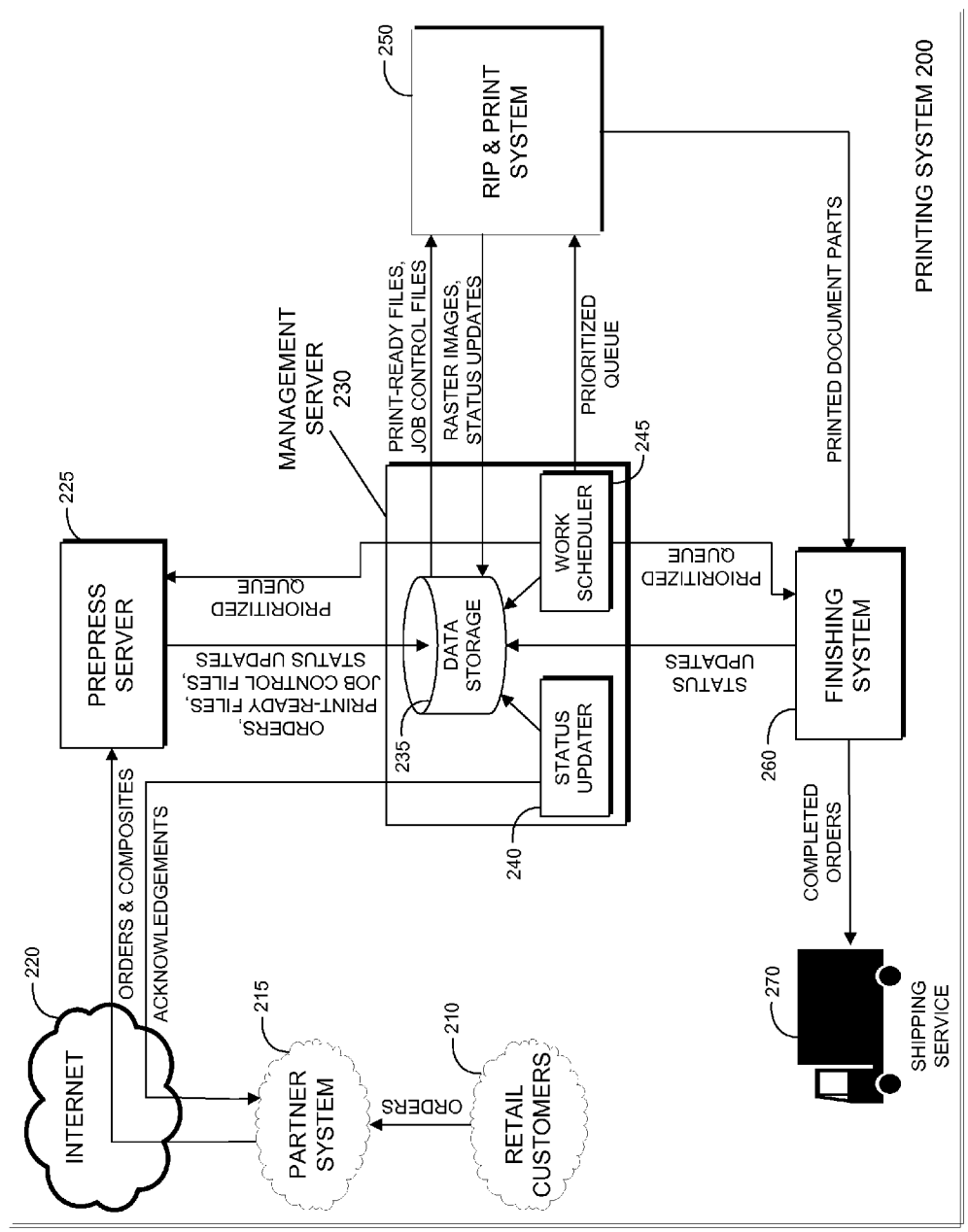
FIG. 2 is a simplified block diagram of a printing system, in accordance with an embodiment of the subject invention.

Reference is now made to FIG. 2, a simplified block diagram of a printing system 200, in accordance with an embodiment of the subject invention. Retail customers 210 place orders with partner system 215. An order may be placed inter alia using a web interface or may be made in a retail store. An order may include multiple products, or "line items," and multiple copies of each line item. Line items are printed items such as calendars, notepads, and books that typically include content supplied by a retail customer. For example, a calendar may include one photo for each month of the year provided by the retail customer; and a notepad may include the name of the retail customer. An example of a web user interface for creating a calendar is illustrated in FIG. 3.

An order is typically stored in a computer file. An order can be represented inter alia as a text file, as a coded binary file, as an HTML formatted file, or as an XML formatted file. In one embodiment, an order is represented by a single XML file with a schema defined by the print system. This schema is referred to as the "native XML format" of the print service. In one embodiment, a single XML file can contain multiple orders.

In one embodiment, partner system 215 represents orders using a proprietary file format. In this case, printing system 200 transforms the proprietary format into its native XML format.

Figure 3:
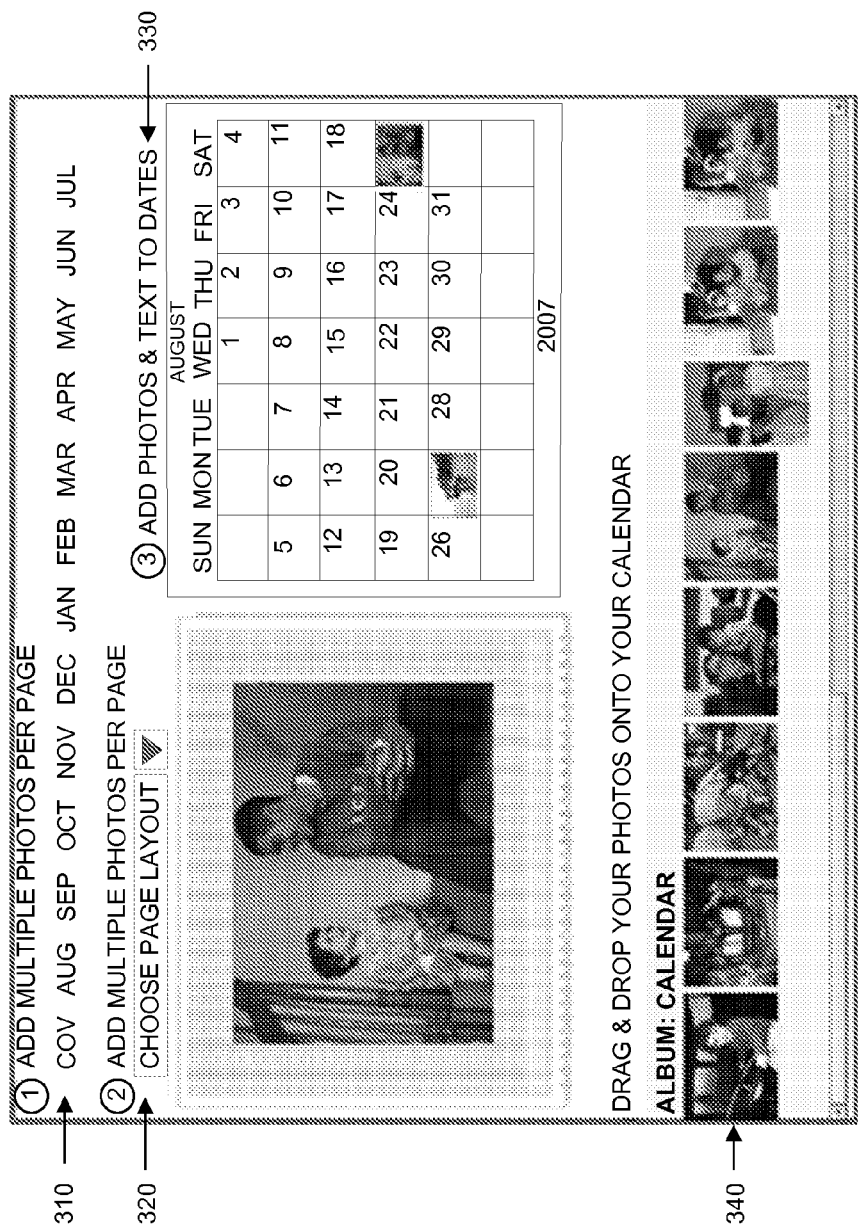
FIG. 3 is an exemplary web user interface used by a retail customer to create a calendar, in accordance with an embodiment of the subject invention.

Reference is now made to FIG. 3, an exemplary web user interface used by a retail customer to create a calendar, in accordance with an embodiment of the subject invention. FIG. 3 is displayed after a customer selects calendar as the product type he/she wishes to create. The customer selects the month he/she wishes to create 310. The customer can change the default page layout 320. The customer can add text and/or photos to individual dates 330. The customer selects photos from a gallery of photos that is displayed at the bottom of the screen 340. The exemplary user interface depicted in FIG. 3 shows two surfaces that would be visible for the month of August 2007: on the left of the screen is a single, large, user-supplied photo; and the right side of the screen shows a graphical layout for the month of August, which includes two small user-supplied photos and several textual comments.

Figure 4:
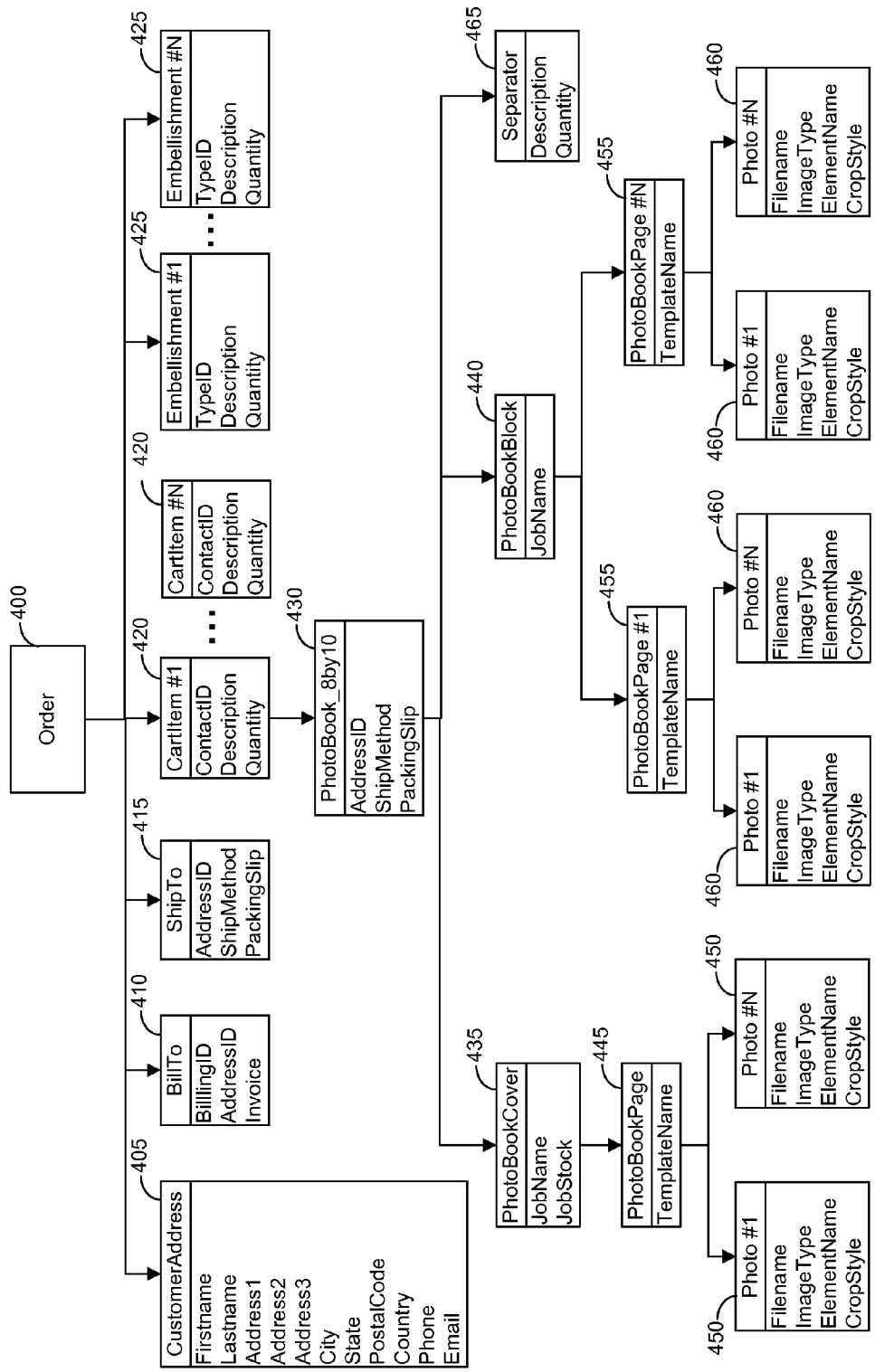
FIG. 4 is a schematic description of a simplified order of a photo book, in accordance with an embodiment of the subject invention.

Reference is now made to FIG. 4, a schematic description of a simplified order of a photo book, in accordance with an embodiment of the subject invention. An order 400 includes CustomerAddress information 405, BillTo information 410, ShipTo information 415, one or more CartItems 420 and optionally or more Embellishments 425. It is noted that a CartItem is also referred to as a line item. Order 400 includes a single 8×10 inch photo book, referred to as PhotoBook_8by10 430. Photo book 430 includes a PhotoBookCover 435, a PhotoBookBookBlock 440, and a NonPrintableMaterial 465. Typically, NonPrintableMaterial 465 is a velum separator page between the cover and the first page of book block. PhotoBookCover 435 includes a single PhotoBookPage 445, which may contain one or more photo 450 elements. PhotoBookBookBlock 440 includes one or more PhotoBookPage 455 elements. Each PhotoBookPage 455 includes one or more photo 460 elements.

In one embodiment, the format of each printed element, such as cover page and book block pages, is defined by a template that is commonly agreed to between the partner and the printing system provider. Thus, in FIG. 4 the photo book cover template is specified by a TemplateName attribute within PhotoBookPage 445. Similarly, the template of each book block page is specified by the TemplateName attribute within PhotoBookPage 455. Use of said commonly agreed to templates ensures that each line item can be processed by the printing system. Also, when using said commonly agreed to templates only information not defined by the template need be included in the order. For example, a calendar page template might define the position of textual, graphical and user-supplied photos for a cover and for each month of the year. Since this formatting information is defined in the template and stored by the printing system it doesn't have to be included in the order.

In one embodiment, PhotoBookPage 445 contains multiple photos, indicated by Photo #1 450, and Photo #N 450. The number of photos and size and location of each photo are specified by the template referred to by the TemplateName attribute within PhotoBookPage 455. Each photo can be inter alia supplied by the customer, selected by the customer from a list of photos presented by the partner, or supplied by the partner with no input from the customer.

In one embodiment, each surface is provided by the partner as a composite image that includes all required information to print one surface. In this embodiment, each PhotoBookPage 445 element includes a single photo 450 element whose filename attribute references a single composite image.

The XML code for a simplified, exemplary, order for a photo book that follows the schema depicted in FIG. 4 is provided in LISTING 1 at the end of this specification. The order includes a single line item, an 8by10 photo book. The 8by10 photo book includes a cover, 2 book block pages and a velum separator page. Due to the use of templates, formatting information is not required in the XML order.

Referring back to FIG. 2, in one embodiment, partner system 215 receives an order from retail customer 210 and transforms it into the native XML of printing system 200 before providing it via the Internet 220 to printing system 200. In another embodiment, partner system 215 provides the order to printing system 200 in the proprietary format of partner system 215, and printing system 200 transcodes the order into its native XML.

A prepress server 225 downloads orders from partner system 215. Prepress server 225 "serializes" each order. When an order is serialized, each line item in the order is decomposed into one or more material parts. Each printed material part is assigned a unique serial number. For example, in a photo book the cover and the book block would be assigned two different serial numbers. Each serialized item can be individually managed and tracked. Further, line items with quantity greater than one are individually serialized. Non-printed material parts are not assigned serial numbers since they are not customized; only a part number is necessary to uniquely denote a non-printed material part. Each serialized material part is processed in a series of steps, first by prepress server 225, then by a RIP and print system 250 and finally by a finishing system 260.

It is pointed out that in some cases a processing step is performed on an order, in some cases on a single material part and in some cases on multiple material parts. For purposes of clarity, the term "work item" is used to refer to a data structure that defines the atomic or most granular level of processing performed at a particular processing step in the printing workflow, regardless of whether it is performed on an order or on one or more material parts.

Each work item has a state associated therewith. TABLE 1 lists the states that a work item can be in, in accordance with an embodiment of the present invention. Upon completion of certain processing steps, the state associated with the work item is changed to a new state. This is referred to as updating the work item's state. A work item's state determines what processing step will next be performed on it.

A management server 230 performs tasks that are common to multiple processing steps including work schedule management performed by a work scheduler 245, communication of status to partner 215, performed by a status updater 240, and data storage and management performed by a data storage 235. It will be appreciated by those skilled in the art that management server 230 may be a separate computer system, or it may be configured as hardware or software running inside of prepress server 225, print server 1130 (described with reference to FIG. 11), or finishing server 1305 (described with reference to FIG. 13). It will be further appreciated that management server 230 may be several computer systems, each configured with one or more central processing units (CPUs) to run one or more processes. For example, one management server 230 may run work scheduler 245 and status updater 240, while another management server runs data storage 235.

Data storage 235 includes a relational database management system (RDBMS) and physical storage. In addition, database management system may include network attached storage (NAS), which is data storage that can be connected directly to a computer network to provide centralized data access and storage for other network devices. For example, NAS would enable prepress server 225, a print server 1130, or finishing server 1305 to directly store and share data.

TABLE 1

Processing States

| ID | State Name | Where Occurs | Short Description |
|---|---|---|---|
| 1 | Hold | Prepress | The work item is on hold for a non system failure, such as missing images or corrupt images, also duplicate orders from the partners will be parked in hold for manual release. |
| 2 | Error | Prepress | The work item has failed to process because of a system failure - the printing system will automatically re-process the work item |
| 3 | Pending-Order-Import | Prepress | Order has been received from a partner and is available for processing and import into data storage. |
| 4 | Pre-Order_Import-Error | Prepress | An error occurred while processing an order. The order cannot be imported into data storage. |
| 5 | Pre-Batch | Prepress | The order has been successfully accepted into the system |
| 6 | Reprint | Prepress | A temporary place for work items that were mishandled and need reprinting |
| 7 | Downloaded | Prepress | All composite images within the order have been downloaded or moved to data storage |
| 8 | Imaged | Prepress | All composite images within the order have been verified. |
| 9 | Processed | Prepress | The order has been serialized into work items or serial items and is ready for lotting. |
| 10 | Lotted | Prepress | The serial item has been grouped into a lot (lotted). The lot is ready for raster image processing. |
| 11 | Imported | RIP & Print | The lot has been accepted by a raster image processor (RIP). |
| 12 | Ready-to-Print | RIP & Print | The lot has been ripped and is ready for press |
| 13 | Moved-to-Press | RIP & Print | The lot has been moved to a press for printing |
| 14 | Imported-to-Press | RIP & Print | The printing press has accepted the lot for printing |
| 15 | Printed | RIP & Print | The lot has been printed |
| 16 | Bindery | Finishing | The serial item is in the bindery |
| 17 | Bound | Finishing | The serial item is bound and ready for sorting and fulfillment |
| 18 | Ready-to-Ship | Finishing | The serial item is sorted and ready to be packaged |
| 19 | Packaged | Finishing | The serial item has been placed into a package for shipping |
| 20 | Shipped | Finishing | The serial item has been shipped |
| 21 | Voided | Finishing | The serial item has been voided |

Work scheduler 245 runs periodically as a background process on management server 230. For each state listed in TABLE 1, work scheduler 245 maintains a prioritized queue of all work items awaiting processing for each state. The prioritized queue for each state is stored in data storage 235. When a work item changes state, work scheduler 245 moves the work item to the appropriate prioritized queue. For example, a work item that is being printed is in the prioritized queue for the "Imported-to-Press" state (with reference to TABLE 1). When the work item prints successfully, print server 1130 changes the state of said work item to "Printed." When work scheduler 245 determines that said work item has changed state it moves the work item into the prioritized queue for the "Printed" state. It then recalculates the priorities for all work items in the prioritized queue for the "Printed" state.

In one embodiment, processing steps that correspond to the states Pre-batch, Imaged, Processed, operate at the order level. In one embodiment, the prioritized queue for each of these states lists the orders in first-in-first-out sequence.

Orders whose state is "Processed" state have been serialized into serial items, or material parts, each having a unique serial number. At this point, each work item in the prioritized queue for the "Processed" state corresponds to a material part. Each work item includes inter alia the attributes listed in TABLE 2 below:

TABLE 2

Work Item Attributes

| Attribute Name | Description |
| --- | --- |
| Order_ID | The order that this work item pertains to. |
| Material_Part_ID | Material part identifier |
| Tote_ID | Identifier for the physical container that printed material parts are to be placed into |
| Late_Priority | BOOLEAN (TRUE, FALSE). The current estimate of whether the order to which the material part belongs will exceed SLA delay if any further delay is incurred in processing this material part. Described in greater detail relative to FIG. 6. |
| Shop_Priority | Date. The current estimate of the date at which the order to which the material part belongs, will complete processing. Described in greater detail relative to FIG. 6. |
| Destination | Shipping destination of the part to which this material part belongs. |
| Single_Part | BOOLEAN (TRUE, FALSE). Does this part comprise multiple material parts? |
| Destination_Part_Quantity | Quantity of parts being shipped to same destination. |
| Order_Priority | Date. Priority of the order, computed when the order is first accepted by the system. |
| N-up Priority | Check the waste percentage and determine if this print lot is able to be created. If it fails the test the print lot will not be created and all parts will be put back into the pool. (Applies to variable length parts only.) |
| State | State of the work item: completed, pending, error. |

It is to be noted that not all of the work item attributes are necessary or available at each processing step. For example, the Tote_ID attribute isn't assigned until a work item reaches the "Lotted" state.

Work scheduler 245 sorts the queue of work items using the attributes listed in TABLE 2 as sort keys to produce a prioritized queue. The order of the sort keys and the sorting algorithm itself may vary at each processing step.

Periodically, work scheduler 245 recalculates the late priority and shop priority attributes of each work item. It then sorts the prioritized queue to both maximize efficiency and minimize the risk that the time to process any of the orders dependent on work items in the prioritized queue will exceed the SLA-defined Max_Delay period. The order of work items allows the processing module associated with each state to simply select the first work item in the prioritized queue and begin processing. Methods employed by work scheduler 245 to prioritize work items are further described with reference to FIG. 6.

Using a network data transfer protocol, a prepress server 225 downloads an order and any composite files included in the order from partner system 215 and then performs a series of processing steps to prepare the orders for printing. The output from prepress server 225 is one print-ready file and one or more job control files, which are stored in data storage 235. Prepress server 225, said print-ready file, and said job control files are described in greater detail relative to FIG. 8 and FIG. 9.

Status updater 240 runs as a background process on management server 230. When status updater 240 detects that a work item has changed status, it updates the status of the corresponding order. In one embodiment, status information for an order is defined as the lowest status of each of the material parts that comprise the order where lowest status is defined by the Table 1 ID value. In one embodiment, status updater 240 notifies partner system 215 of status changes in the form of an email acknowledgement message. In one embodiment, when status updater 240 detects that a n order has changed status, it stores status information in an acknowledgement file on data storage 235. Then, partner system 215 can download the acknowledgement file at its convenience. In one embodiment, the acknowledgement file is in XML format. In another embodiment, status information for each order is provided using a SOAP web service. In this embodiment, partner system 215 requests information for a specific order using a SOAP request message and status updater 240 provides the current status of the order by sending a SOAP response message. The SOAP protocol is maintained by the World Wide Web Consortium (W3C) and the specification can be found at http://www.w3.org/TR/soap/.

When a work item reaches a state of "Lotted" (TABLE 1) it is assigned to RIP and print system 250. The output from RIP and print system 250 is one or more printed material parts that serve as input to finishing system 260. RIP and print system 250 is described in greater detail with reference to FIG. 11.

Printed material parts are then processed by a finishing system 260. Most steps performed by finishing system 260 are performed by human operators. Finishing system 260 first binds printed parts into complete printed products. Finishing system 260 then prints a packing slip, packages the printed products with the packaging slip and affixes a mailing label onto the package. At this point, finishing system 260 assigns the final state of "Shipped" to the work item. When all work items that comprise an order have shipped the order is deemed to be complete. Finishing system 260 is described in greater detail with reference to FIG. 13.

Figure 5:
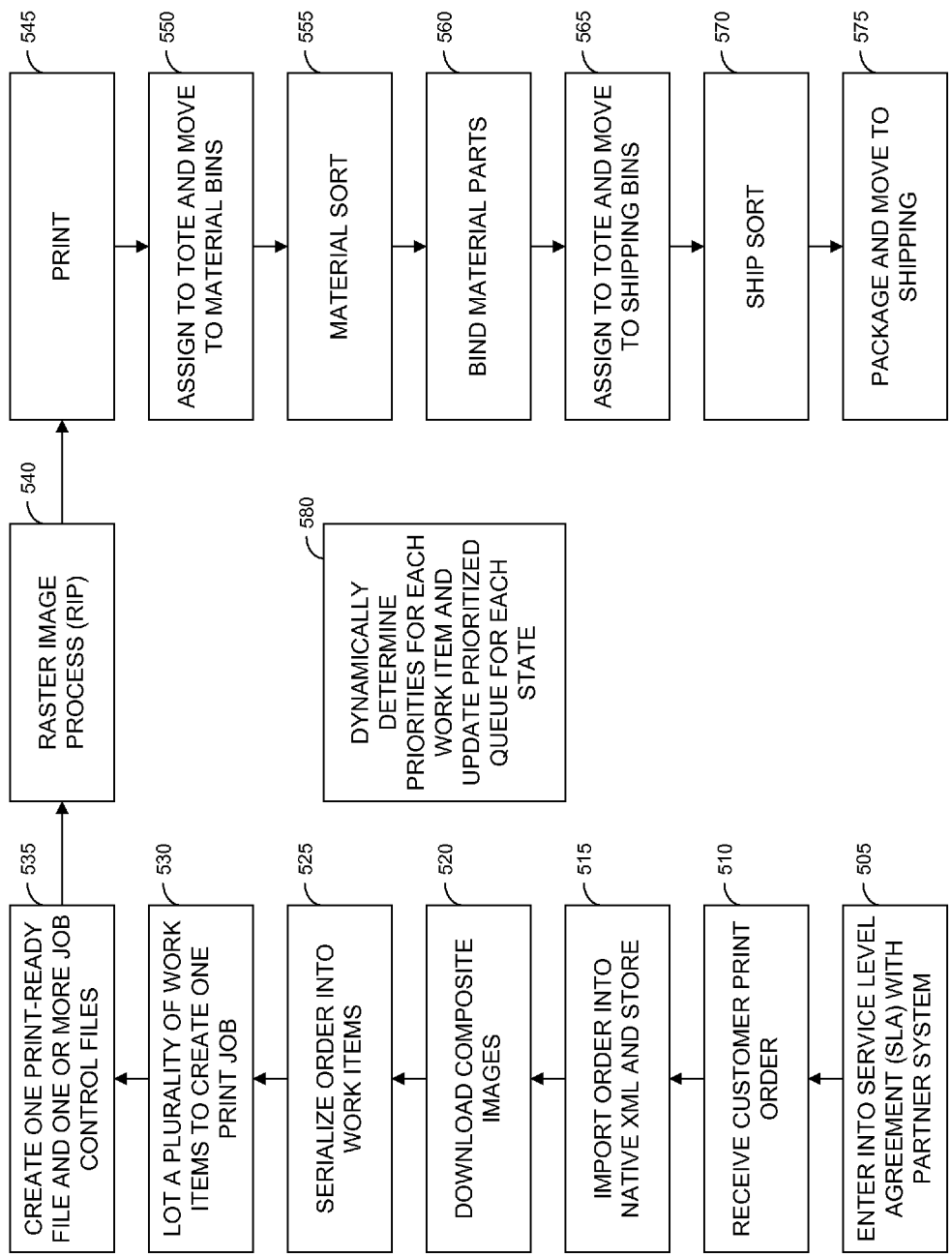
FIG. 5 is a simplified flowchart of an overall method for a printing system, in accordance with an embodiment of the present invention.

Reference is now made to FIG. 5, which is a simplified flowchart of an overall method for a printing system, in accordance with an embodiment of the present invention. At Step 505 printing system 200 enters into a service level agreement (SLA) with a partner system 215. Each SLA defines inter alia a maximum service delay, termed "Max_Delay", for each print product that can be accepted by printing system 200. At Step 510 once the SLA between the partner system and printing system is effective, printing system 200 commences to receive customer print orders from partner system 215. At Step 515 printing system 200 imports an order into its native XML and stores it in data storage 235.

The work performed by printing system 200 to process a print order is divided into a plurality of tasks which are referred to as work items. When the processing of a work item completes, a new state is associated with it. At Step 580 work scheduler 245 maintains a prioritized queue of work items for each state. Work scheduler 580 is depicted independently from the other steps in FIG. 5 because is executes on a scheduled basis independent of the other steps. Work scheduler 245 updates the prioritized queue for each state by calculating the priority of each work item within each prioritized queue. It then orders each prioritized queue using an algorithm that takes into account the updated priorities.

At Step 520 prepress server 225 downloads from partner system 215 one composite image for each image referenced in a print order. At Step 525 prepress server 225 serializes an order into a plurality of work items, also referred to as serial items, where each work item has a unique serial number. At Step 530 one or more work items are lotted to create a print job. At Step 535 prepress server 225 creates one or more print-ready files and one or more job control files that will control the printing process and print the print job. At Step 540 RIP and print system 250 raster image processes a print job and the resulting raster image file(s) is stored in data storage 235. At Step 545 RIP and print system 250 prints a print job. RIP and print system 250 is further described with reference to FIG. 11.

At Step 550, finishing system 260 assigns each work items, which references a single material part, to a tote and a shop floor operator places the material part inside the designated tote. When a tote is full shop floor operator moves the tote near to a designated material bin unit. At Step 555 shop floor operator material sorts the material parts from a tote into designated material bins. Material sorting is further described with reference to FIG. 14. At Step 560 the material parts are bound. At Step 565 finishing system 260 assigns the bound material parts to totes and a shop floor operator moves the totes near to a shipping bin unit. At Step 570 the bound material parts, also referred to as serial items, are ship sorted into designated shipping bins. At Step 575 the bound serial items are withdrawn from the shipping bins, packaged and moved to the shipping area. Finishing system 260 is further described with reference to FIG. 13.

Figure 6:
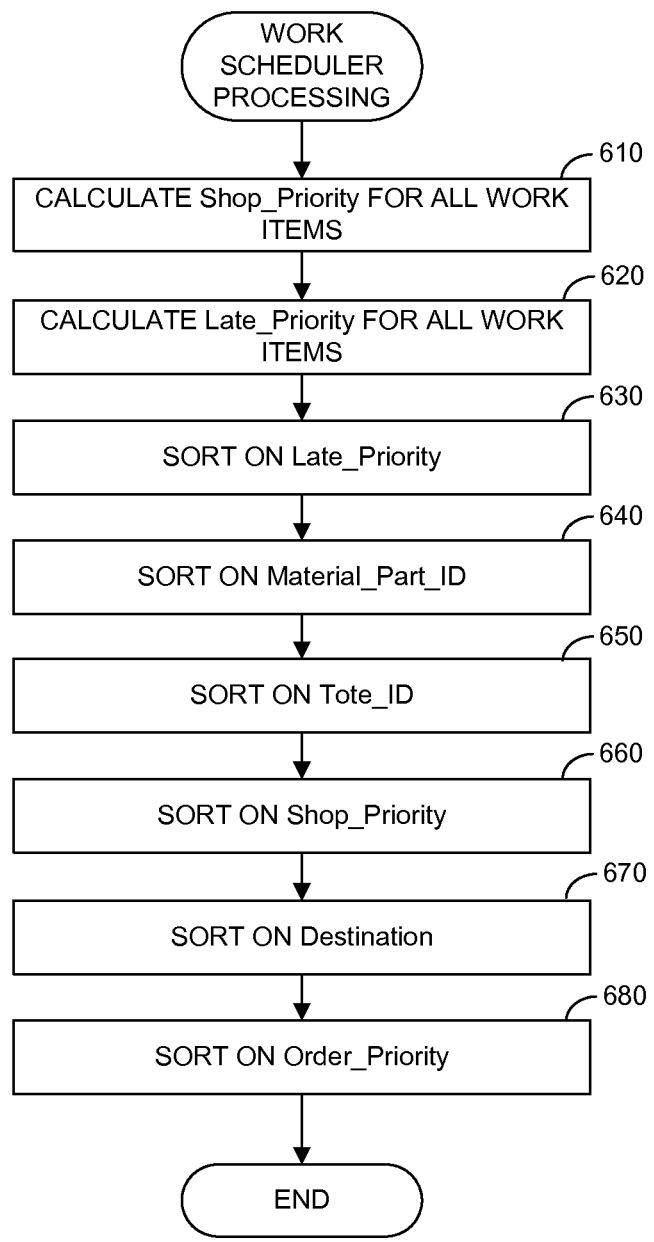
FIG. 6 is a flow diagram describing the processing steps performed by a work scheduler to calculate the priorities of work items, in accordance with an embodiment of the subject invention.

Reference is now made to FIG. 6, which is a flow diagram describing the processing steps performed by work scheduler 245 (FIG. 2) to calculate the priorities of work items, in accordance with an embodiment of the subject invention. Work scheduler 245 executes periodically on management server 230. Work scheduler 245 maintains and periodically updates the order of a prioritized queue of work items for each state. Once an order reaches the "lotted" state, it has been serialized into material parts and the prioritized queue consists of an ordered list of material parts and attributes associated with each material part.

FIG. 6 describes one example method for ordering the prioritized queue of work items for a processing state. It will be appreciated by one skilled in the art that various methods may be used to prioritize the list of work items and that a different method may be used at each state.

At Step 610 the Shop_Priority is calculated for all work items in the prioritized queue. The calculation of Shop_Priority is described relative to FIG. 7A. At Step 620 the Late_Priority attribute is calculated for all work items in the prioritized queue. The calculation of Late_Priority is described relative to FIG. 7B.

At Step 630 the prioritized queue is sorted on the attribute Late_Priority such that all material parts whose Late_Priority attribute is set to TRUE are moved to the top of the queue. Material parts whose Late_Priority attribute is set to TRUE must be processed immediately in order to avoid having their corresponding print product exceed the contractual delay requirement defined in a SLA for the print product, referred to as Max_Delay. Note that if the time spent within printing system 200 exceeds Max_Delay for any product in an order then the entire order is deemed to exceed the Max_Delay requirement.

At Step 640 the prioritized queue is sorted on the Material_Part_ID. At Step 650 the prioritized queue is sorted on the Tote_ID attribute. Totes are described relative to FIG. 13. At Step 660 the prioritized queue is sorted on the Destination attribute. Destination is described relative to FIG. 13. At Step 670 the prioritized queue is sorted on the Order_Priority attribute. Order_Priority is described relative to FIG. 7B.

Figure 7A:
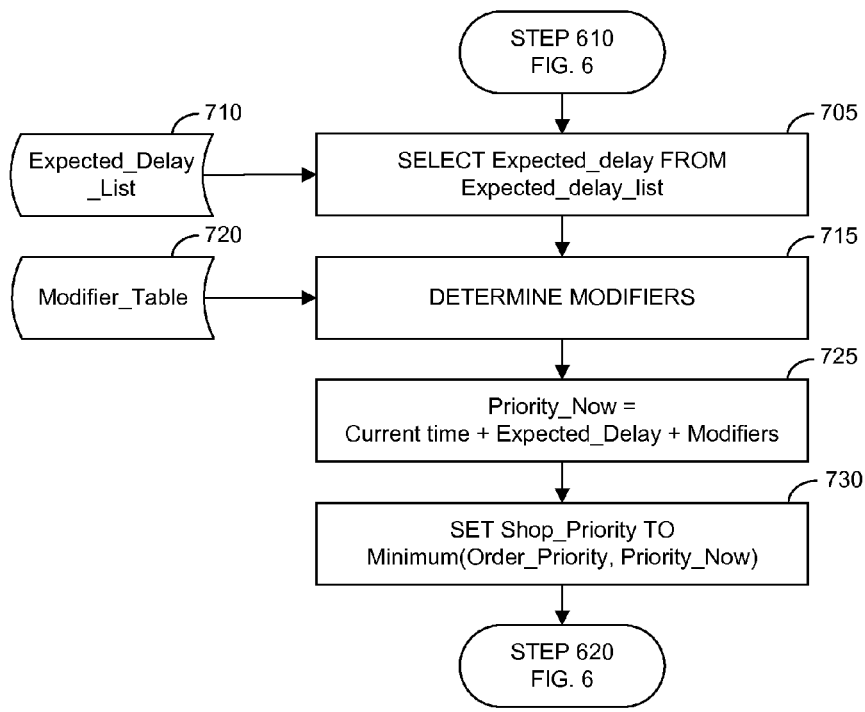
FIG. 7A is a flow diagram describing the processing steps performed by a work scheduler to compute the Shop_Priority attribute for a work item, in accordance with an embodiment of the subject invention.

Reference is now made to FIG. 7A, which is a flow diagram describing the processing steps performed by a work scheduler to compute the SLA-based priority attribute for a work item, in accordance with an embodiment of the subject invention. FIG. 7A describes one algorithm for calculating Shop_Priority, which is a date/time that represents the best estimate of the time when a work item will complete all processing and be picked up by a shipper. This algorithm uses the Order_Priority attribute. Order_Priority defines the latest time that a product can be completed and not exceed the Max_Delay requirement. Order_Priority is defined as:

Order_Priority=Order_Accepted_Time+Max_Delay, where Order_Accepted_Time is the time when the order was accepted into the system, i.e. when the order status was changed to "imaged" by prepress server 225. For purposes of clarity, Order_Priority is a date that represents the priority or urgency of a work item relative to other work items in a prioritized queue. The earlier the date, the faster the corresponding work item needs to be processed.

Referring to FIG. 7A, at Step 705, using the Material_Part_ID and the current status of the work item as indices, work scheduler 245 looks up the Expected_Delay from a list of expected delays named Expected_Delay_List 710. In one embodiment, Expected_Delay_List 710 has a format as illustrated below in TABLE 3.

TABLE 3

Expected_Delay_List (in minutes)

| Current State | Line Item | | | |
|---|---|---|---|---|
| | 001-123 (Photo Book) | 002-432 (Sticker) | 003-456 (Notecard) | 004-789 (Calendar) |
| Imaged | 420 | 340 | 310 | 410 |
| Processed | 402 | 322 | 192 | 392 |
| Lotted | 370 | 307 | 277 | 360 |
| Imported | 328 | 301 | 271 | 315 |
| Ready-To-Print | 315 | 285 | 255 | 301 |
| Moved-To-Press | 245 | 265 | 235 | 235 |
| Press-Imported | 210 | 213 | 215 | 201 |
| Printed | 130 | 124 | 132 | 122 |
| Bindery | 110 | 112 | 104 | 99 |
| Bound | 102 | 100 | 82 | 87 |
| Ready-To-Ship | 73 | 65 | 53 | 62 |
| Packaged | 42 | 34 | 40 | 34 |
| Shipped | — | — | — | — |

In one embodiment, an Expected_Delay value from the Expected_Delay_List is the empirically determined average number of minutes for a work item to complete processing, i.e. move from a given state to the final state (State=Shipped). For example, using TABLE 3, a photo book whose state is "Lotted" will require 370 minutes on average to reach the "Shipped" state, i.e. to complete processing.

At Step 715, work scheduler 245 consults Modifier_T-ABLE 720 to determine if there are any "modifiers" that must be taken into account when determining job priority. Modifiers are values that are subtracted or added to the priority in order to respectively increase or decrease priority. Modifiers can be inter alia per customer, per partner, per part, or per order. For example, for a two week period all orders coming from a specific partner can be increased in priority by 1 hour. As another example, if an order had been delayed for a particular customer, then future orders for that customer can be accorded higher priority for a period of time using modifiers.

At Step 725 Priority_Now is calculated by adding together the current time, the Expected_Delay determined at Step 705 and any modifiers determined at Step 715. In one embodiment, times are represented as the number of minutes since a reference time, which is taken to be Jan. 1, 1900. In another embodiment, times are represented as days and fractions of days since a reference time.

At Step 730, the work item's Shop_Priority attribute is set to the smaller of Order_Priority and Priority_Now.

Figure 7B:
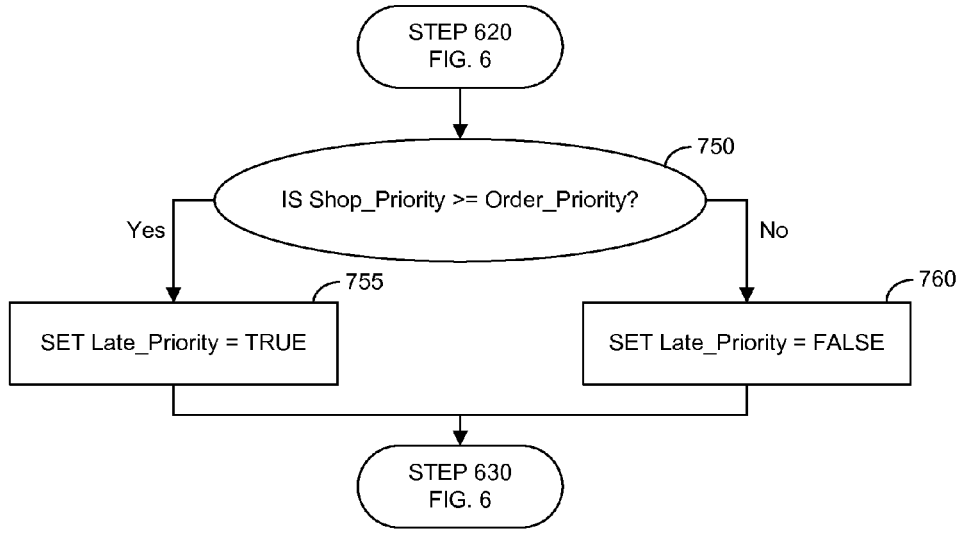
FIG. 7B is a flow diagram describing the processing steps performed by a work scheduler to calculate the Late_Priority attribute for a work item, in accordance with an embodiment of the subject invention.

Reference is now made to FIG. 7B, which is a flow diagram describing the processing steps performed by a work scheduler to calculate the Late_Priority attribute for a work item, in accordance with an embodiment of the subject invention. At Step 750 a determination is made as to whether Shop_Priority is greater than or equal to Order_Priority. If this is the case, then the order corresponding to the work item is in danger of being late; accordingly, at Step 755 the Late_Priority attribute is set to TRUE. If Shop_Priority is less than Order_Priority then there is some slack time and at Step 760 Late_Priority is set to FALSE.

As an example of the way that priorities come into play, the book block and cover of a photo book each comprise different work items, are assigned different serial numbers, and are processed separately by the prepress system and the RIP and print system. Typically, book block and covers will be printed in different print runs on different printers. While both the book block and cover of a photo book will each have the same Order_Priority, work scheduler 235 will calculate different Shop_Priorities for each work item at each state to reflect the different delays that each component will experience. This step-by-step approach to scheduling guarantees that the entire order is printed on time, per the Max_Delay requirement.

Figure 8:
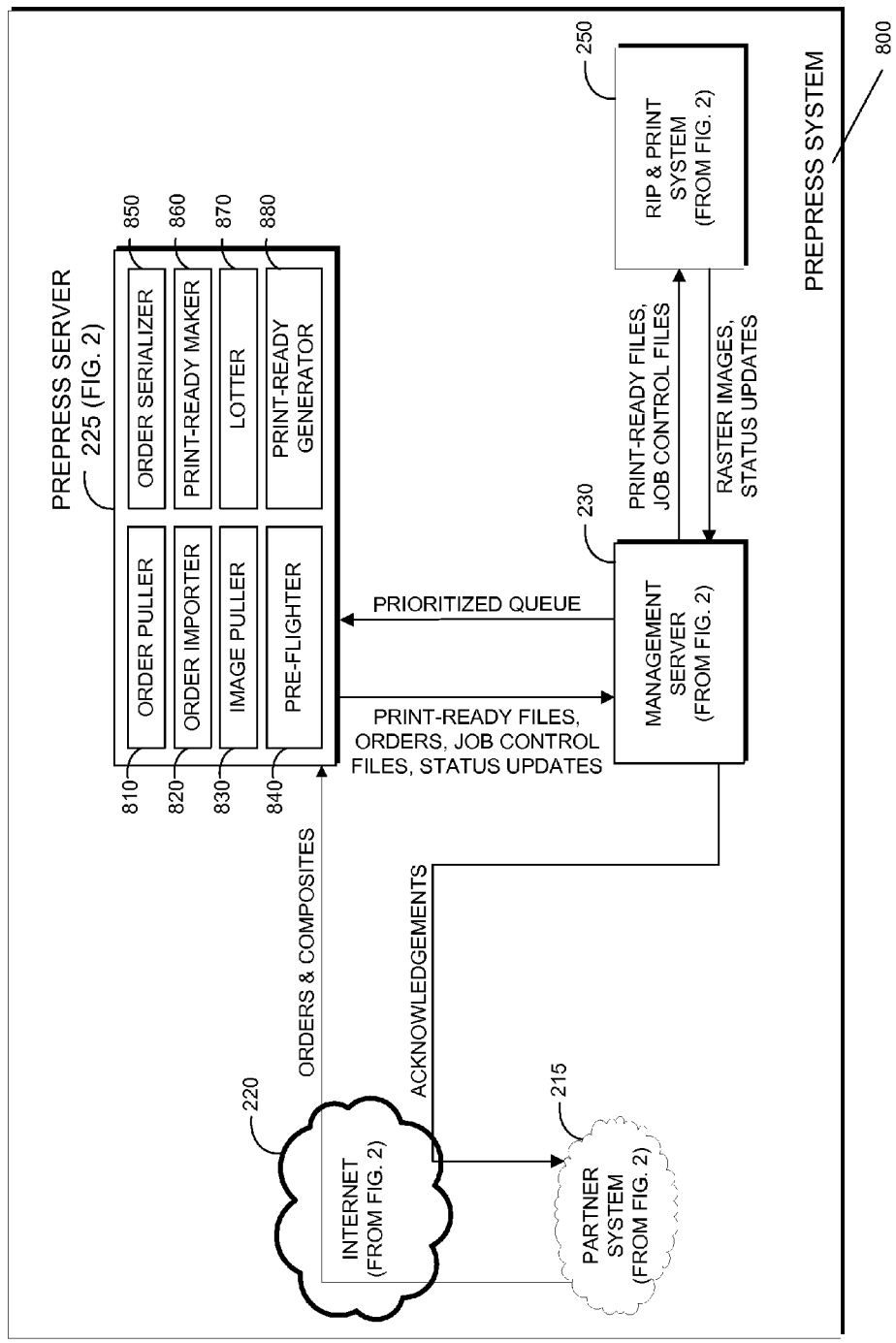
FIG. 8 is a simplified block diagram of a prepress system, in accordance with an embodiment of the subject invention.

Reference is now made to FIG. 8, which is a simplified block diagram of a prepress system, in accordance with an embodiment of the subject invention. Relative to FIG. 2, this block diagram introduces additional detail concerning prepress server 225.

An order puller 810 downloads orders from partner system 215 (FIG. 2), using an appropriate file transfer method. File transfer methods performed by order puller 810 include File Transfer Protocol (FTP), User Datagram Protocol (UDP), Hypertext Transfer Protocol (HTTP), and Simple Object Access Protocol (SOAP).

An order importer 820 transforms the order into the native XML format of the printing system and stores it in data storage 235 (FIG. 2). The XML attributes of the order are stored in a relational database within data storage 235 according to a pre-defined schema; this provides efficient access to the order data during subsequent processing steps. Order importer 820 also "serializes" the order into material parts that are separately processed. For example, the serialization of a line item consisting of five copies of a single calendar will result in the creation of five work items or serial items, one for each calendar, each with a unique serial number. Serialization enables the printing system to efficiently manage reprints. Thus if one copy of a calendar is damaged, then only that copy need be reprinted.

In one embodiment, partner system 215 provides orders in a proprietary file format; in this case, order importer 820 transforms the non-standard format into the native XML format of the printing service.

In one embodiment, partner system 215 provides orders in a XML format that uses a proprietary schema; in this case, order importer 820 uses XSLT to transform the XML into the native XML format of the printing system. XSLT is a language for transforming XML documents conforming to a first schema into XML documents conforming to a second schema. The XSLT standard is defined and maintained by the worldwide web committee (W3C—see http://www.w3.org/TR/xslt).

An image puller 830 downloads one composite image for each surface referenced in a line item, and stores the composites in storage system 235. For example, if the line item consists of a greetings card, then prepress server 225 downloads four composite image files corresponding to the four surfaces shown in FIG. 1. In one embodiment, a composite image can be in inter alia JPEG, PDF, EPS, BMP or TIFF format. In one embodiment, image puller 830 retrieves composites using standard file transfer methods including FTP, UDP and HTTP. Although a line item may call for a quantity greater than one to be printed, the composite images associated with the line item are only downloaded once.

A pre-flighter 840 "validates" or tests each composite image. Pre-flighter 840 analyzes each image to ensure that the image is formatted correctly and contains meaningful information. In the printing industry, such validation is commonly referred to as "pre-flight." A variety of tests can be performed to ensure that the image data is meaningful. In one embodiment, thumbnails are generated and an operator views the thumbnails to ensure that they are visually meaningful. It is also possible to perform automated tests; for example, correlation tests can identify if the images contain noise or meaningful data. Additionally, if multiple composite images are included in a single file, pre-flighter 840 extracts each composite image to a separate file. Additionally, if the composite image is in the PDF file format then the PDF file will be checked to determine if there are mistakes in the PDF file that would cause the composite image to be rejected or printed incorrectly. Examples of mistakes that can be identified include inter alia wrong document size, missing fonts, incorrect image resolution, use of layers, and PDF/X print compliancy.

An order serializer 850 takes an order as input and serializes the order into one or more new work items each of which consists of a single material part. Printed material parts are rasterized and printed by RIP and print system 250. Printed and non-printed material parts are then bound together and packaged by finishing system 260 to form one or more completed, ready-to-ship, products.

A print-ready maker 860 creates one print-ready file for each surface and one or more job control files for the print job. A print ready file describes the formatting and content of a document in a manner suitable for printing. The print-ready file can be in any standard or non-standard page document description format including inter alia PostScript, PDF, Microsoft Word, HTML, and rich text format (RTF). In one embodiment, the print ready file uses the portable data format (PDF). PDF is defined and maintained by Adobe Systems, Inc. More information about PDF can be found at http://www.adobe.com/products/acrobat/adobepdf.html.

Each print-ready file references one or more composite images, which remain in data storage 235. Reference to a composite image is made using comments that are embedded in the print-ready files. The comments follow the open prepress interface (OPI) specification. OPI is defined and maintained by Adobe Systems, Inc. More information about OPI can be found at partners.adobe.com/public/developer/en/ps/5660_OPI_2_0.pdf. The comments specify all information necessary for RIP and print system 250 to substitute the composite image data into the print-ready file during the printing process.

A job control file specifies how PDF files are to be combined and provides information about crop marks, score marks and barcode. The job control file provides information that is specific to the printing workflow but which is not contained in the print-ready file. For example, a job control file specifies inter alia where to place crop marks, and whether to print a bar code and if so where to place it. In one embodiment, the job control file uses job definition format (JDF) standard. JDF is defined and maintained by CIP4. More information about JDF can be found at http://www.cip4.org/.

A lotter 870 combines print jobs together, a process commonly referred to as "lotting." Lotting offers two main advantages: (1) it improves efficiency by increasing the number of material parts printed per print job and thus decreasing the amount of time spent transitioning from one print job to the next, and (2) it minimizes paper wastage for variable length products such as photo books. The lotting process intelligently selects parts that can be combined together into a lot and produces a job control file that provides the necessary information for combining the parts to the printer. In one embodiment, lotting always combines parts of the same type; for example, notepads are only lotted with notepads, calendars are only lotted with calendars. In one embodiment, parts of different types can be combined; for example, notepads and calendars can be printed together as part of a single print run.

Lotting takes into account two cases: (1) the case of fixed length material parts, and (2) the case of variable length material parts. In the case of fixed length material parts, e.g. calendars and notecards, a preset number of material parts are lotted together. For example, in one embodiment, a lot size of 10 calendars is used where possible. Thus if 10 copies of the same calendar have been ordered they can be lotted together to form one print run. Alternatively, if two orders, one for 8 calendars and one for 2 calendars, are waiting in the prioritized queue then they can be lotted together. In the case of variable length material parts, e.g. photo books, lotting attempts to minimize the percentage of wasted paper in a print run. One method for lotting is described below with reference to FIG. 10. It will be appreciated by those skilled in the art that in order to perform efficient lotting, prepress server 225 must take into account print run efficiency, variable length material parts such as photo book book block, wastage requirements that are established for each material part, and Max_Delay requirements defined per partner for each line item.

Lotter 870 takes into account the imposition requirement for the type of material part that is being lotted. Imposition is the process of intelligently arranging surfaces on a sheet of paper. Imposition is desirable because printing presses typically print multiple pages on a single large sheet of paper to make the most efficient use of the paper and to shorten the time required for printing. Imposition ensures that after the sheets of paper are printed, folded and trimmed, the resulting pages will be in the proper order. For example, in one embodiment greeting cards are printed "4-up." This means that four greeting card surfaces are printed on a single sheet of paper by the printer.

A print-ready generator 880 takes as input all the print-ready files (one per surface) for a lot and the job control files for the lot, and produces as output a single print-ready file and one or more job control files. If the raster image processor (RIP) that will subsequently be used to process this print job is capable of interpreting and processing embedded OPI commands then print-ready generator 880 continues to embed OPI comments. However, not all RIPs are capable of processing embedded OPI comments; if that is the case, then print-ready generator 880 incorporates the composite images stored in data storage 235 into the print-ready file. Raster image processing is discussed in greater detail with reference to FIG. 11.

TABLE 4, below, summarizes the processing required for one lot of ten calendars

TABLE 4

Example of processing required for one lot of ten calendars

| Process | Print-ready file processing | Job control file processing |
| --- | --- | --- |
| Print-ready maker | Creates 1 print-ready file per calendar surface. There are 12 double sided pages (one for each month) + 1 double sided cover page in a calendar. Hence, 13 double sided pages × 2 files per page = 26 print-ready files per calendar. | Creates 1 job control file per calendar; thus creates 10 job control files. |
| Lotter | Lots 10 calendars together., Creates 26 × 10 = 260 print-ready files per lot. | Combines 2 calendars per page to take into account 2 UP imposition; thus creates 5 new job control files. |
| Print-ready generator | Creates a single print ready file (from the 260). | Combines the 5 job control files into a single job control file for the entire print job. Also, creates two additional job control files: (1) describes the imposition of two calendars onto a single page, and (2) provides additional details such as what color management profile to use and whether the print run is simplex or duplex. |

Figure 9A:
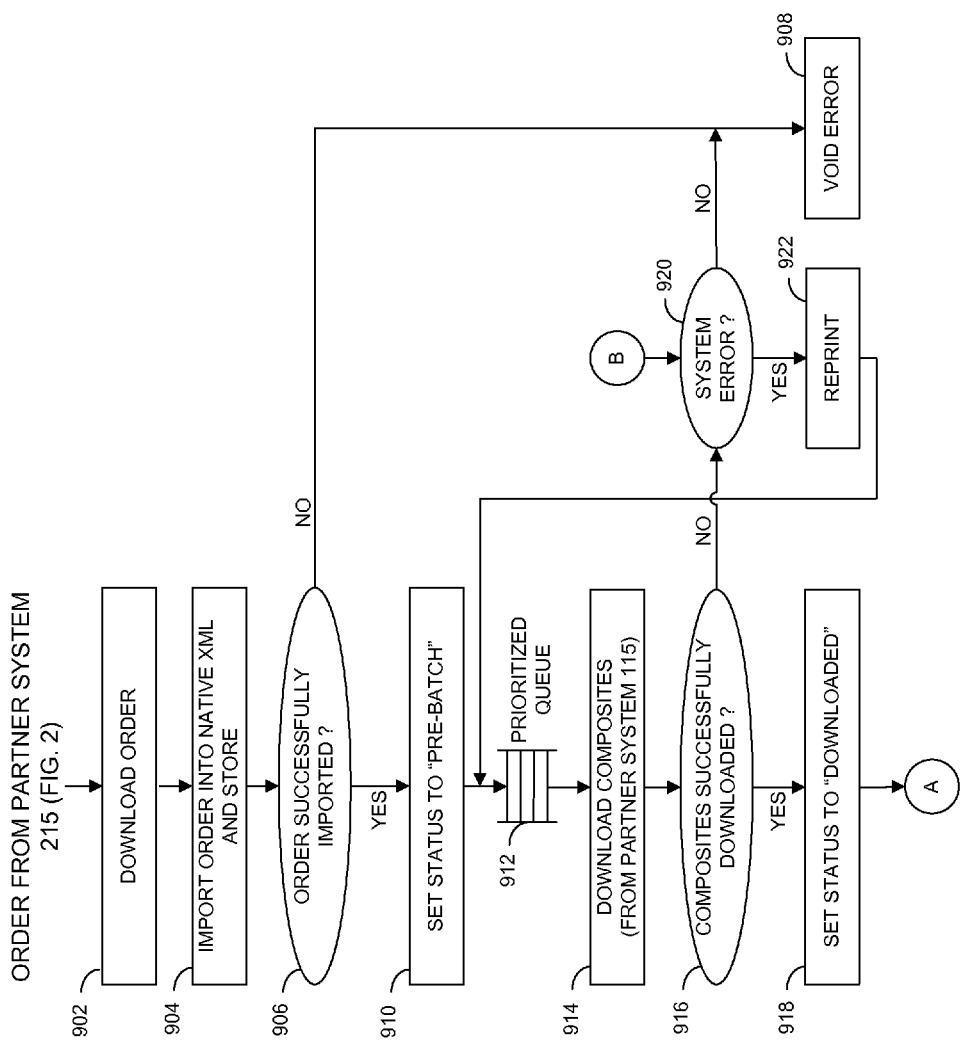
FIG. 9A is a flow diagram illustrating the initial processing steps performed by a prepress server, in accordance with an embodiment of the subject invention.

Reference is now made to FIG. 9A, which is a flow diagram illustrating the initial processing steps performed by a prepress server, in accordance with an embodiment of the subject invention. At Step 902, order puller 810 downloads an order from partner system 215 (FIG. 2). The order is initially assigned a state of "Pending-Order-Import" which signifies that the order has been downloaded but has not yet been processed. At Step 904, order importer 820 performs two tasks: (1) it transforms the order into the native XML format of the printing system and stores it in data storage 235; and (2) it stores the XML attributes of the order in a relational database within data storage 235 according to a pre-defined schema.

At Step 906 a determination is made as to whether the order was successfully imported. If no errors are detected, then the order is determined to have been successfully imported and at Step 910 the order state is set to "Pre-batch." The Pre-batch state signifies that the order has been successfully imported and stored.

If at Step 906 an error was detected, then at Step 908 the state of the order is set to "Pre-Order-Import-Error" which signifies that the order will not be processed any further. Partner system 215 can resubmit the order at its option.

At Step 912, the order enters the prioritized queue for the "Pre-batch" state. At Step 914 image puller 830 selects the first work item in the prioritized queue to process. The Image puller 830 downloads one or more composite images for each surface in each line item in the order and stores them in storage system 235. At Step 916 a determination is made as to whether the prepress server has successfully downloaded all composites for each line item in the order. If so, then processing continues to Step 918 where the state is set to "Downloaded." If at Step 916 it is determined that one or more composite images was not successfully downloaded then processing continues at Step 920.

At Step 920, a determination is made as to whether the error is due to a system error. System errors include inter alia power failure, disc failure, processor failure, and disc full. Generally, system errors result from hardware or software failures in printing system 200 (FIG. 2). Generally, system errors are quickly detected and corrected by operations staff. Non-system errors generally result from corrupted, incorrect or missing image data. If at Step 920 a system error is detected then at Step 922 the state is set to Reprint and the order is then returned to the prioritized queue at Step 912 and subsequently, another attempt will be made to process the order. If at Step 920 a non-system error is detected then the order cannot be successfully processed and control moves to Step 908 where, as previously described, the order is voided.

Figure 9B:
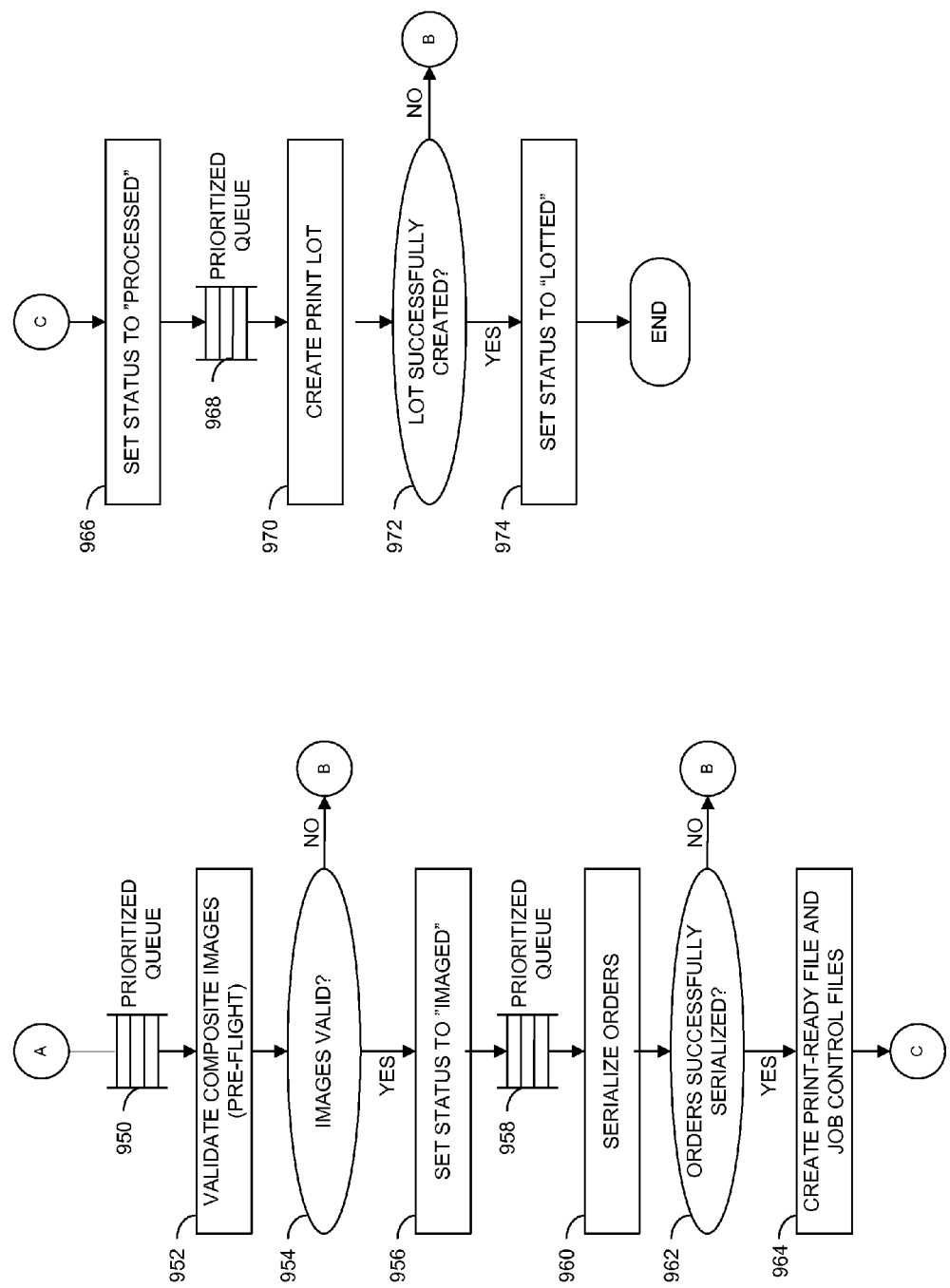
FIG. 9B is a flow diagram illustrating the final processing steps performed by a prepress server, in accordance with an embodiment of the subject invention.

Reference is now made to FIG. 9B, which is a flow diagram illustrating the final processing steps performed by a prepress server, in accordance with an embodiment of the subject invention. At Step 950 the order now enters the prioritized queue for the "Downloaded" state. At Step 952 pre-flighter 840 validates all composite images for one line item. Additionally, if multiple composite images are included in a single file, pre-flighter 840 extracts each image to a separate file.

At Step 954, if all the downloaded composite images in the order are determined to be valid, then at Step 956 the state is set to "Imaged." Once the order has been imaged, all parts of the order including its XML specification and image content have been verified and stored in data storage 235. At this point the "contractual clock" starts relative to the Max_Delay requirement. If, at Step 954, it is determined that any of the composite image are not valid then processing continues at Step 920.

At Step 958, the order enters the prioritized queue for the "Imaged" state. At Step 960 order serializer 850 selects the first work item in the prioritized queue to process. Order serializer 850 serializes the order into one or more new serial items each of which consists of a single material part.

At Step 962 a determination is made as to whether the order was successfully serialized. If it is determined that the order was not successfully serialized then processing continues at Step 920.

At Step 964, for each material part in the order, print-ready maker 860 takes the composite image(s) that corresponds to the material part as input and produces a print-ready file and a job control files as output. The print-ready file and the job control file(s) are used subsequently by the RIP and printing service.

At Step 966 the state of the order is set to "Processed." For purposes of clarity is should be noted that at the "Processed" state each work item references one serial item or material part. Then, at Step 968 the order enters the prioritized queue for the "Processed" state. At Step 970, lotter 870 attempts to lot the material part with other material parts waiting in the prioritized queue in order to efficiently use printer resources as previously described. Finally, print-ready generator 880 takes as input the print-ready files (one per surface) and the job control file and produces as output a single print-ready file and one or more job control files.

If, at Step 972, the print-ready file and the job control files are determined to have been created successfully, then, at Step 974 the prepress server 225 sets the state to "Lotted." If an error occurs during creation of either the print ready file or the job control file, then control is transferred to Step 920.

Figure 10:
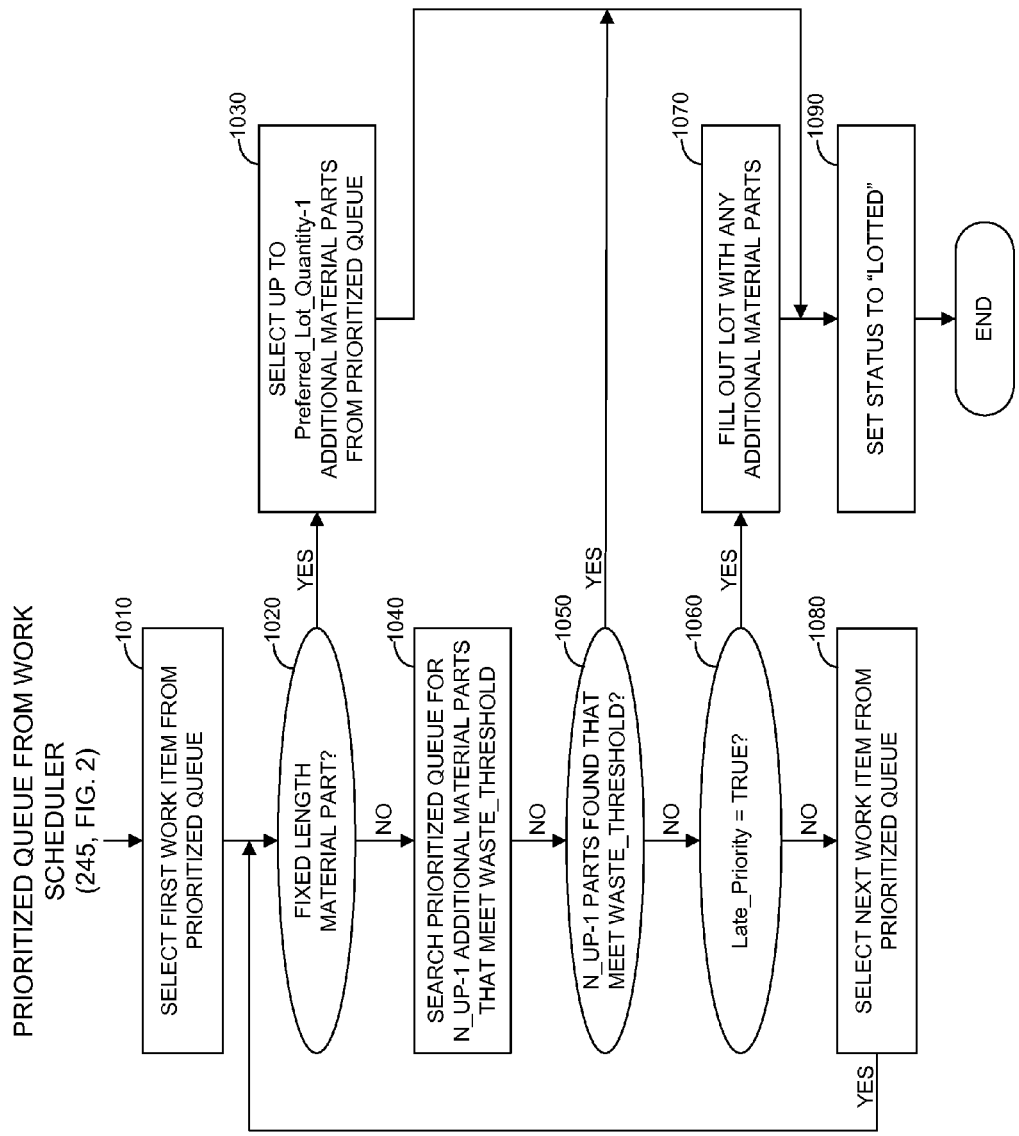
FIG. 10 is a flow diagram that illustrates the processing steps performed by a prepress server to select material parts for a print lot, in accordance with an embodiment of the subject invention.

Now reference is made to FIG. 10, which is a flow diagram that illustrates the processing steps performed by lotter 870 to select material parts for a print lot, in accordance with an embodiment of the subject invention. The exemplary method described in FIG. 10 attempts to lot together one or more material parts to create one print lot. At Step 1010, lotter 870 selects the first work item from the prioritized queue for the "Processed" state. At Step 1020, lotter 870 determines if the work item to be processed is a fixed length material part. It should be noted that a fixed length material part has a fixed number of pages such as a greeting card or calendar. If the material part is fixed length, then at Step 1030 lotter 870 searches the prioritized queue in priority order and attempts to select up to Preferred_Lot_Quantity-1 additional material parts of the same type where Preferred_Lot_Quantity is the preferred number of material parts of this type to be included in a single lot. Lotter 870 will attempt to select up to Preferred_Lot_Quantity of the same material parts but will accept less. As an example, if Preferred_Lot_Quantity is ten (10) in the case of calendars and lotter 870 has selected a first calendar to lot, then it attempts to include 9 additional calendars in the lot. If only 5 additional calendars are included as work items to be processed in the prioritized queue for the "processed" state then those five calendars together with the first will be lotted together for further processing and then printing. In other words, in the case of lotting fixed length material parts lotter 870 simply lots whatever material parts are currently available in the prioritized queue and doesn't wait for additional material parts to arrive.

If at Step 1020 it is determined that the material part to be processed is not fixed length, i.e. it is variable length, then at Step 1040 lotter 870 searches the prioritized queue in priority order and attempts to select up to N_UP-1 additional material parts of the same type such that taken together the N_UP-1 material parts enable the print lot to meet a Waste Threshold requirement. The term "N_UP" refers to the number of pages that are imposed on a single sheet during printing. For example, the book block of a photo book is a variable length material part that is printed 2 Up. In this case N_UP-1 is one (1); thus at Step 1040 lotter 870 searches the prioritized queue for another photo book book block material part which if selected would enable the two photo book book block material parts to meet said Waste Threshold requirement. A "Waste Threshold" requirement is a pre-established value and is defined as the percentage of pages wasted due to inefficient lotting. Table 5, below, presents an example of how the Waste_Threshold requirement is applied to variable length products. In the example, there are five photo book book block material parts awaiting lotting. The algorithm first selects the #1 position material part and then attempts to find a second material part that would enable the two material parts to meet meets the Waste_Threshold requirement. If the Waste_Threshold requirement is set to 10%, meaning that the target is to waste less than 10 percent of the pages, then material part in the eighth position would be selected to fill the lot as 21 sheets of paper will be required to print the two photo book book block material parts and each of the sheets of paper except for the last include two surfaces. The last sheet will include only one surface. Thus the page wastage is only 0.5*1/21=2.4%. However, if the Waste_Threshold requirement is set to 15% then the material part in the fifth position, that is 16 pages long would be selected, because of the 20 paper sheets required for printing 5 would have a single surface and the paper wastage would be 0.5*5/20=12.5%.

TABLE 5

Example Of Variable Length Lotting

| Position in Prioritized Queue | Number of Book Block Pages |
|---|---|
| 1 | 20 |
| 3 | 10 |
| 5 | 15 |
| 8 | 21 |
| 12 | 8 |

At Step 1050 a determination is made as to whether N_UP-1 material parts were selected for lotting that meet the Waste_Threshold. If so then lotting has been successful and processing continues at Step 1090. If not, then at Step 1060 a determination is made as to whether the first work item's Late_Priority attribute is set to True. If Late_Priority is set to TRUE then no further delay can be tolerated and processing continues at Step 1070. At Step 1070 any additional material parts of similar type are included in the lot up to a total lot size of N_UP even if the additional subparts will cause the lot to exceed the Waste_Threshold. After completing the lot processing continues at Step 1090.

If at Step 1060 the Late_Priority attribute for the work item is not TRUE, i.e. it is FALSE, then the lot has not been completed and processing proceeds at Step 1080. At Step 1080 the next work item in the prioritized queue is selected and processing returns to Step 1020. If the last work item in the prioritized queue is reached then processing begins again with the first item. At Step 1090 the state of the work item is set to "Lotted."

Figure 11:
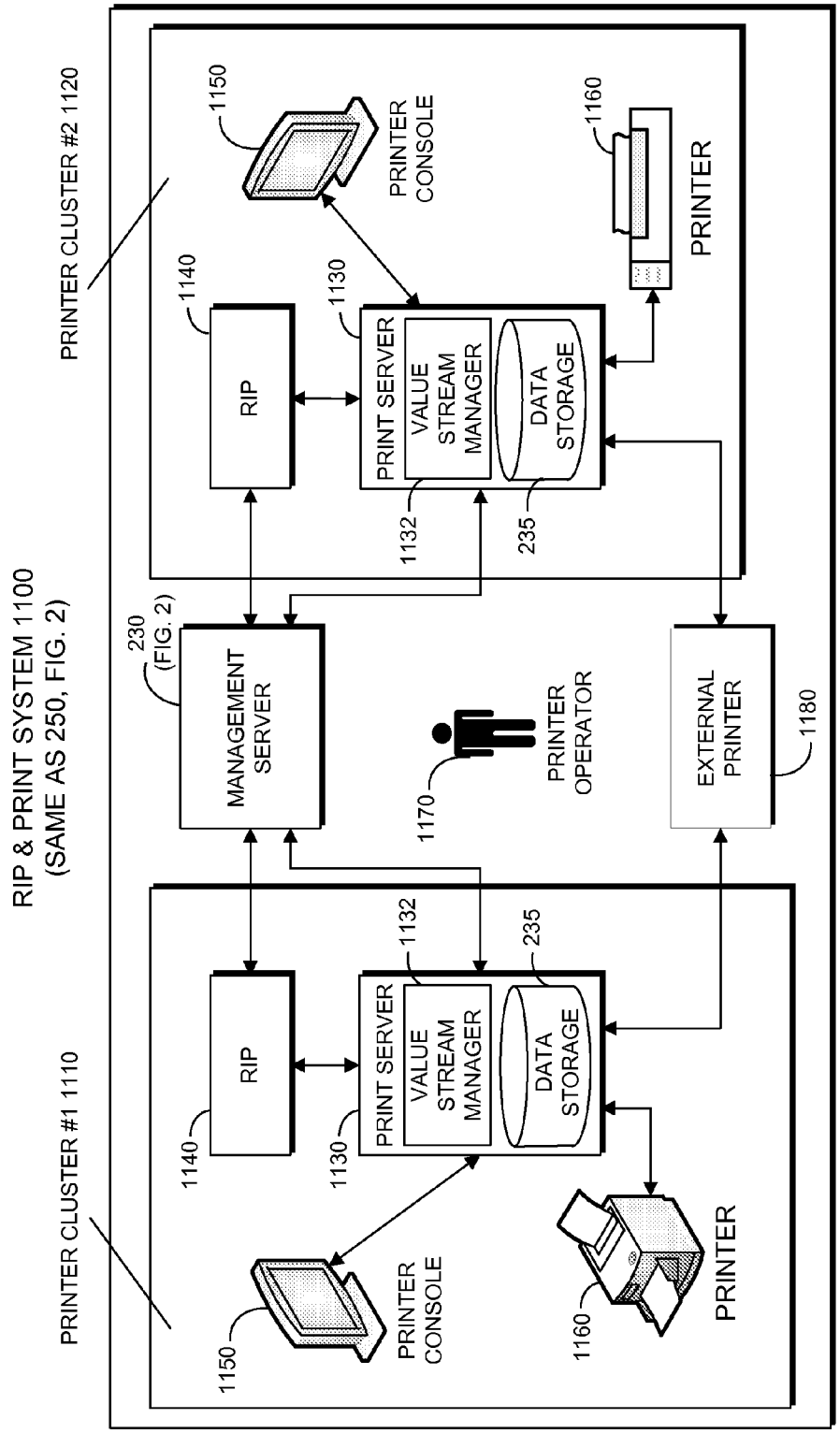
FIG. 11 is a simplified block diagram of a RIP and print system, in accordance with an embodiment of the subject invention.
Figure 12:
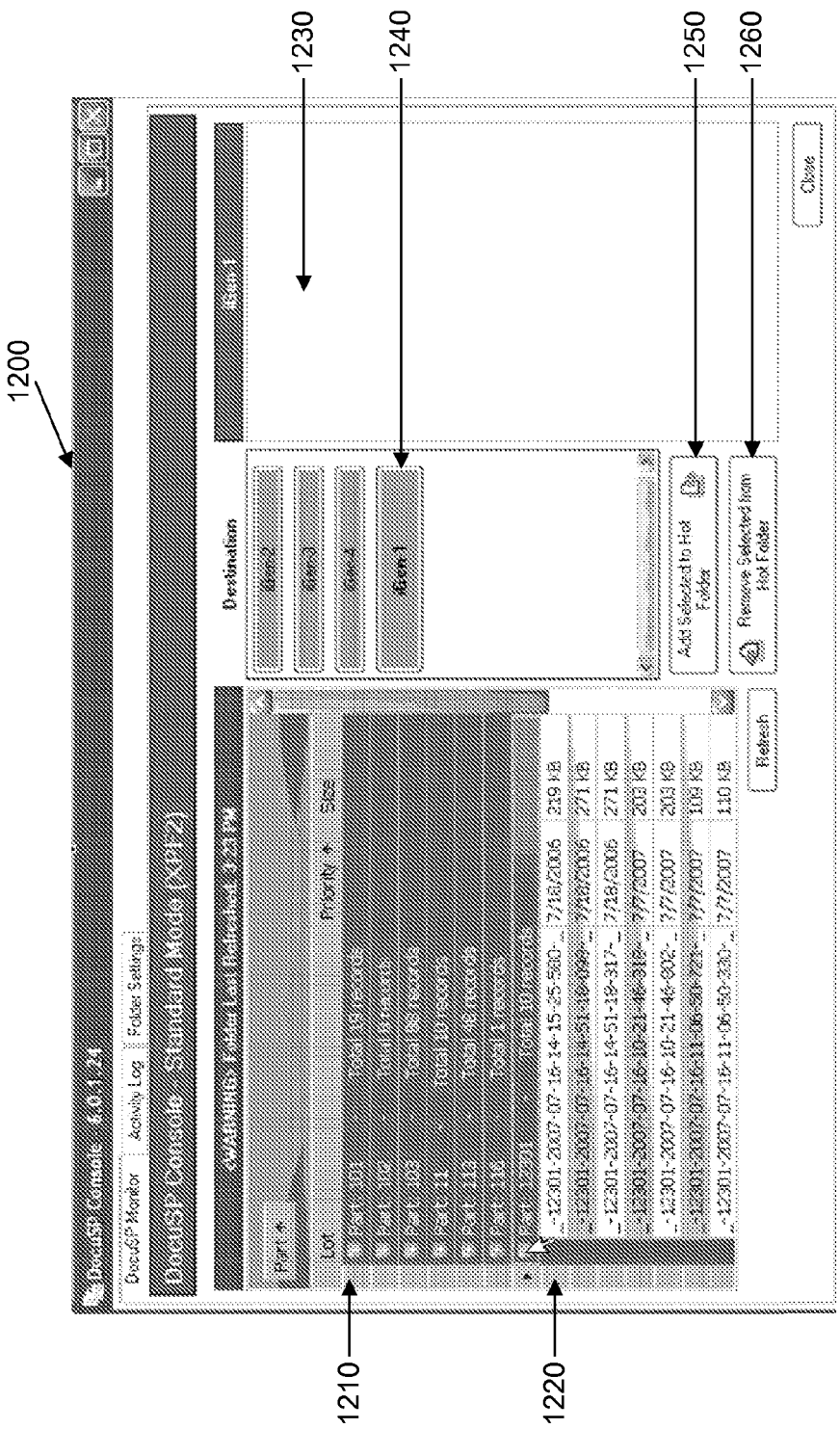
FIG. 12 is an illustrative screen capture from a printer console, in accordance with an embodiment of the subject invention.

Now reference is made to FIG. 11 which is a simplified block diagram of a RIP and print system 1100, in accordance with an embodiment of the subject invention. Two printer clusters are illustrated, a printer cluster #1 1110 and a printer cluster #2 1120. Each printer cluster includes a print server 1130, a raster image processor (RIP) 1140, a printer console 1150 and a printer 1160. In a RIP and printing system there is typically one such cluster for each type of printer and there are typically a plurality of different types of printers. Further a printer cluster may include a plurality of printers 1160 of the same type. Vendors of commercial quality printers include HP, XEROX, and Kodak. Typically, a commercial quality printer requires a RIP 1140 designed specifically for said commercial quality printer. It will be appreciated by those skilled in the art that print server 1130 may be a separate computer system, a card running inside a server computer, or it may be configured as software or hardware inside of prepress server 225, management server 230, or finishing server 1305 (FIG. 12). In one embodiment, print server 1130 includes a value stream manager 1132 that implements a dynamic cadence method described with reference to FIGS. 17-21. Print server 1130 is equipped with or has access to data storage 235. While data storage 235 is depicted as being within print server 1130 in FIG. 11, as previously described, data storage may be alternatively or additionally be located in management server 230, prepress server 225, finishing server 1305 or may be network attached storage (NAS) accessible across a network. Similarly, it will be appreciated by those skilled in the art that RIP 1140 may be a separate computer system, a card running inside a server computer, or it may be configured as software or hardware inside of prepress server 225, management server 230, print server 1130, or a finishing server 1305. RIP 1140 may also be equipped with or have access to data storage 235.

Print server 1130 periodically reviews the prioritized queue of work items for the "Lotted" state provided by work scheduler 245 (FIG. 2). Print server 1130 selects the highest priority work item that needs to be raster image processed (commonly referred to as "ripped") and transfers the print-ready file and job control file for the work item to RIP 1140. Print server 1130 then changes the work item state to "Imported."

RIP #1 1120 receives a print-ready file and a job control file as input. If the print-ready file embeds OPI comments to reference high resolution composite images, then RIP 1140 replaces the OPI comments with the composite images stored in data storage 235 during raster image processing. When RIP 1140 completes raster image processing the print job, print server 1130 updates the work item state to "Ready-to-print." RIP 1140 stores the ripped print data in data storage 235.

Print server 1130 displays the prioritized queue for the "Ready-to-Print" state produced by work scheduler 245 on printer console 1150. The prioritized queue includes work items whose state may be: Lotted, Imported, Ready-to-Print, Imported-to-Press, or Printed.

A human printer operator 1170 uses printer console 1150 to perform a plurality of functions including selecting and initiating the next work item (commonly referred to as a "print job" while it is being processed by RIP and print system 1100) on printer 1160. Thus, data storage 235 may store print jobs on behalf of RIP and print system 1100. Prior to starting the next work item, printer operator 1170 may have to inter alia load additional paper, load a new type of paper, or add ink. Once printer operator 1170 selects and initiates a work item, print server 1130 moves the ripped print data from data storage 235 to printer 1160. Print server 1130 then updates the work item state to "Imported to Press." Once the print job successfully prints, print server 1130 updates the job status to "Printed."

In another embodiment, described with reference to FIG. 19, print server 1130 releases the highest priority work item to printer in accordance with a dynamic cadence parameter that ensures a flow of print jobs from rip and print system 1100 that matches the pace of work on the shop floor.

In one embodiment, printer operator 1170 can select a print job to be printed by an external printer 1180. For purposes of clarity, the term external printer refers to a printing press or printing service that operates at a physically remote location. The printing press or printing service may be managed by the same organization that manages printing service 200 or it may be managed by a distinct organization or entity. The operator selects a work item whose status is Ready-to-Print and selects an external printer to perform the printing. The ripped data file(s) for the work item is transferred either across a network or are written onto removable storage media and then transferred to external printer 1160. Removable storage media includes inter alia USB drive, DVD-RW, DVD-ROM, CD-RW, CD-ROM and external hard drive. The work item is printed off-site by external printer 1160 and the printed materials are then transported back to printing system 200. When a work item is printed by an external printer 1160 the printed work item itself is scan-verified using a hand-held scanner 1330 to signal that the work item has completed and to change the job status to "Printed." Scan-verification is described with reference to FIG. 13) The print job can be scan-verified by the external printer, in which case a message is generated and sent electronically to print server 1130 or it can be scan-verified by a shop floor operator 1350 after the print job is received. Shop floor operator 1350 is described with reference to FIG. 13. Once the print job successfully and has been scanned, print server 1130 updates the job status to "Printed."

Reference is now made to FIG. 12, which is an illustrative screen capture from a printer console, in accordance with an embodiment of the subject invention. A printer console screen 1200 enables printer operator 1170 to interactively control the flow of print jobs to one or more printers 1160. There is a unique printer console 1150 for each type of printer. Typically, thus one printer console 1150 may control the flow of print jobs to several printers 1160 of the same type. On the left side of printer console screen 1200, an "awaiting print" window 1210 displays each work item which has "Ready-to-Print" status and is thus ready to be printed. The work items, or print jobs as they are commonly referred to, are lotted material parts that have been ripped by RIP 1140 and which are stored on data storage 235. Awaiting print window 1210 displays a part number for each type of material part awaiting printing and the number of waiting print jobs for each said type of material part. It should be noted that the label "Part" that appears in awaiting print window 1210 is an abbreviation for the previously defined term "material part". When a Part is expanded, as shown in 1220, the material part serial number, shop priority date and size are listed for each work item in the list.

A "hot folder" window 1230, entitled "iGen-1", displays each print job that has moved by printer operator 1170 from awaiting print window 1210 to hot folder window 1230. Print jobs in hot folder window 1230 will be printed on the currently selected printer. In this example, the currently selected printer is iGen-1 as indicated by an enabled printer button 1240. In this example, the DocuSP Console controls four printers of the same type: iGen-1, iGen-2, iGen-3, and iGen-4. Printer operator 1170 can drag or more print jobs from awaiting print window 1210 into hot folder window 1230 to initiate printing of print jobs. Alternatively, printer operator 1170 can select one or more print jobs listed in awaiting print window 1210 and then click an "Add Selected to Hot Folder" button 1250 to initiate printing of print jobs. Printer operator 1170 can select print jobs listed in hot folder window 1230 and click on "Remove Selected from Hot Folder" button 1260 to remove print jobs from the hot folder window 1230 and place them back in the awaiting print window 1210.

Figure 13:
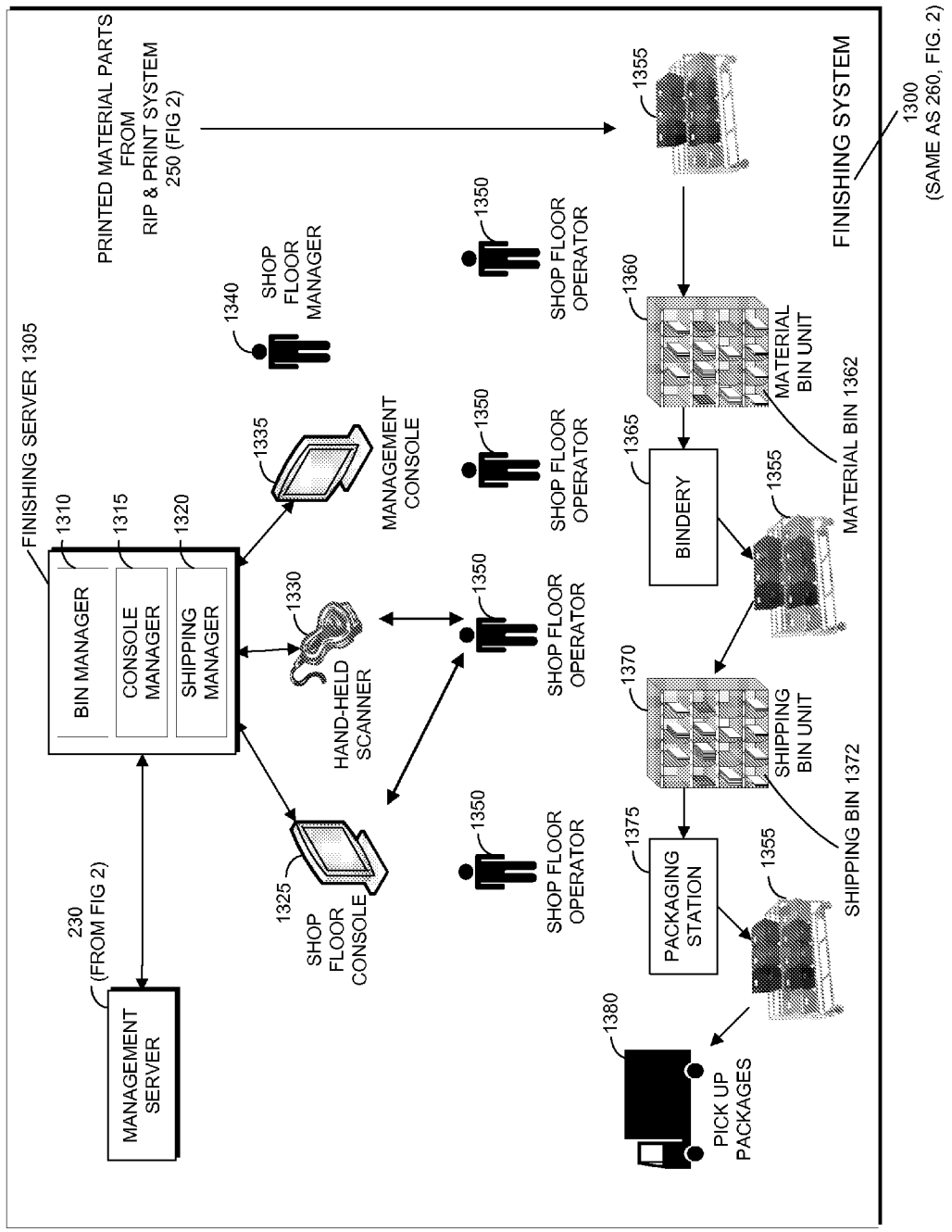
FIG. 13 is a simplified block diagram of a finishing system, in accordance with an embodiment of the subject invention.

Reference is now made to FIG. 13, which is a simplified block diagram of a finishing system 1300, in accordance with an embodiment of the subject invention. Finishing system 1300 takes printed parts from the RIP and print system 250 (FIG. 2) and binds them into completed products, packages them and ships them to recipients to fulfill orders received from partner system 215 (FIG. 2). Two types of human staff or workers are employed in finishing system 1300. A shop floor manager 1340 utilizes a management console 1335 to manage the flow of tasks and a shop floor operator 1350 performs sorting, binding, and packaging tasks. A finishing server 1305 exchanges status information with management server 230 and interacts with shop floor manager 1340 via a management console 1335, and with shop floor operator 1350 via a shop floor console 1325 and via a hand-held scanner 1330. Hand-held scanner 1330 can be wirelessly connected to finishing server 1305, or it can be connected by a hard-wired communications line.

Finishing server 1305 contains three processing modules. A bin manager 1310 manages the sorting of printed parts into and out of material bin 1362 by shop floor operator 1350. A console manager 1315 manages the flow of messages to and from shop floor console 1325, hand held scanner 1330 and management console 1335. A shipping manager 1320 generates a packing slip and a mailing label for each package.

It will be appreciated by those skilled in the art that finishing server 1305 may be a separate computer system; or alternatively finishing server software modules, bin manager 1310, console manager 1315 and shipping manager may be configured to run inside of management server 230, prepress server 225 or print server 1130. It will be further appreciated that finishing server 1305 may be several computer systems, each configured to run one or more processes or handle a certain number of jobs. For example, one finishing server 1305 may run bin manager 1310 and shipping manager 1320, while another finishing server 1305 runs console manager 1315.

Once material parts have been printed by RIP and printing system 250 (FIG. 2), they are transported by shop floor operator 1350 using a tote 1355 near to a material bin unit 1360 on the shop floor. For purposes of simplicity, the term "tote" refers to a container of known size used to transport physical items such as material parts, bound products, and packaged products from one location within finishing system 1300 physical premise to another. Typically, one or more totes are placed onto a cart which has wheels and which can be conveniently pushed across finishing system 1300 physical premise. For purposes of clarity, the finishing system 1300 physical premise is referred to as the "shop floor."

A material bin unit 1360 is a temporary storage unit that is constructed from inter alia wood, metal or plastic that is divided into a plurality of material bins 1362, each having a designated height, width and depth. In addition, each material bin 1362 displays a unique bin number, both in numeric format and in bar code format so that it can be conveniently scanned using hand-held scanner 1330. In one embodiment material bins 1362 are of different sizes, e.g. 1 inch, two inches, and three inches wide.

Shop floor operator 1350 performs material sorting, which is also known as collating. Before starting to sort materials into material bins 1360, shop floor operator 1350 signs in to finishing server 1305. To sign in, shop floor operator 1350 uses either hand-held scanner 1330 or shop floor console 1325 to provide his operator id, and to identify his location on the shop floor. After signing in, shop floor operator 1350 may perform material sorting.

Figure 14:
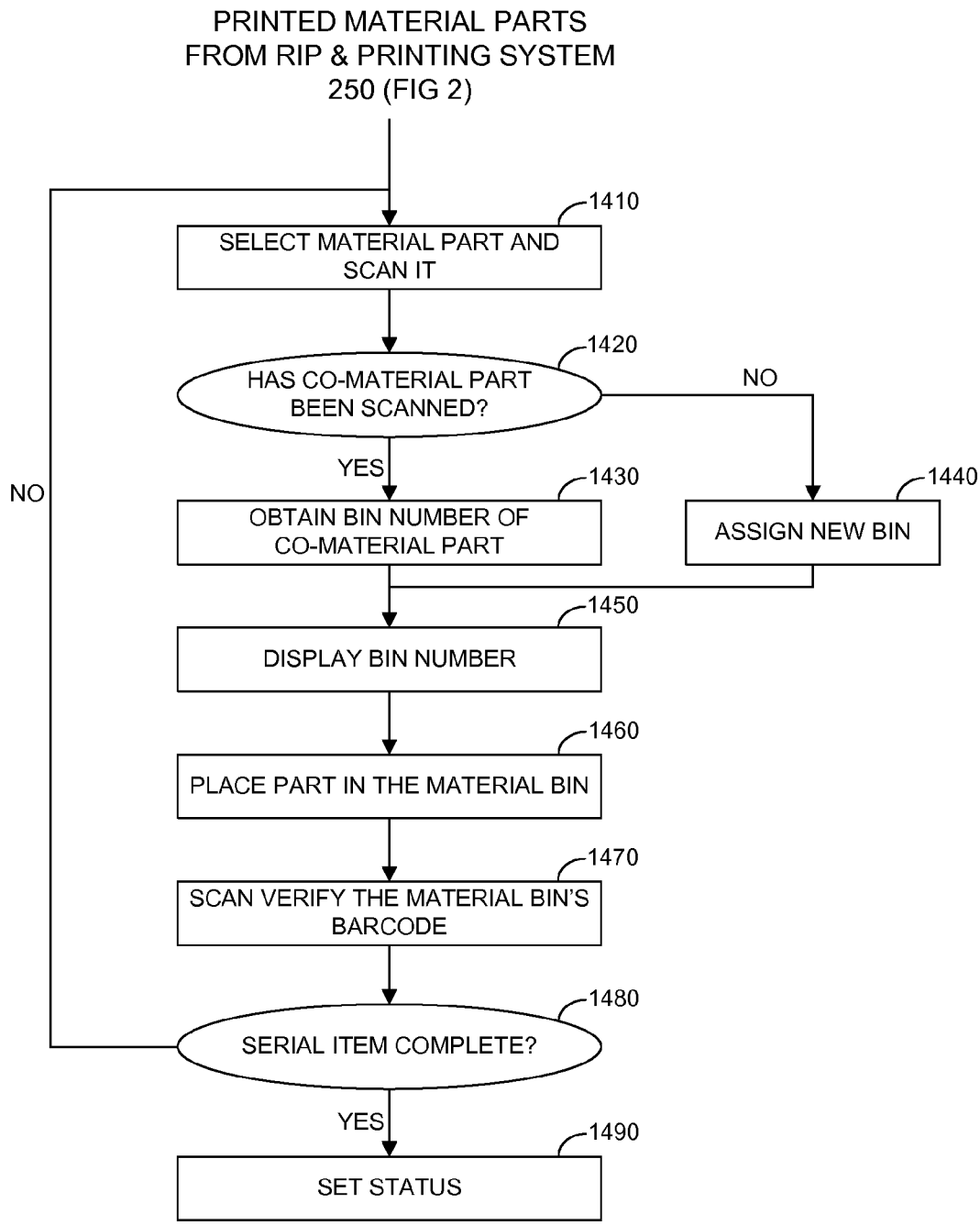
FIG. 14 is a simplified flow diagram that illustrates the steps performed in material sorting, in accordance with an embodiment of the subject invention.

Now reference is made to FIG. 14, a simplified flow diagram that illustrates the steps performed in material sorting, in accordance with an embodiment of the subject invention. At Step 1410 shop floor operator 1350 selects a material part from tote 1355 and scans it using hand-held scanner 1330. Hand-held scanner 1330 scans the bar code printed on the material part and transmits this information to console manager 1315. At Step 1420 a determination is made as to whether a co-material part has already been scanned. A "co-material part" refers to one of the material parts that makes up a serial item. For a serial item to be complete and ready for binding, all of its co-material parts must be placed by shop floor operator 1350 into the same material bin 1362. For example, if a photo book cover is in a material bin 1362, there is a corresponding book block co-material part because a photo book cover and its corresponding book block are required for the complete photo book serial item to be bound. If a co-material part has already been scanned, then, at Step 1430, bin manager 1310 obtains the bin number that the first co-material part was placed into by shop floor operator 1350.

If no co-material part has yet been received, then, at Step 1440, a new material bin 1362 is assigned by bin manager

1310. Bin manager 1310 takes into account the size requirement of the serial item material parts when assigning a material bin. In one embodiment, there are a plurality of bin sizes, e.g. 1 inch, 2 inches, and 3 inches; and bin manager 1310 takes into account the sizes of all available bins in selecting the bin size that will afford the tightest fit. For variable size material parts, such as the book block of a photo book, bin manager 1310 computes the size of the part by taking into account the page count. In one embodiment, if there are multiple bins of the correct size available, bin manager 1310 selects a bin where the adjacent bins are not currently storing parts in order to reduce the possibility of accidental mistakes by shop floor operator 1350 such as placing a material part into the wrong material bin 1362.

At Step 1450, bin manager 1310 provides console manager 1315 with the number of the material bin assigned to the serial item and console manager 1315 displays said material bin number on hand-held scanner 1330. At Step 1460, shop floor operator 1350 places the part into the material bin 1362 that corresponds to said material bin number.

At Step 1470, shop floor operator 1350 uses hand-held scanner 1330 to scan-verify the bar code for said material bin 1362 to indicate that the material part was successfully placed into the correct material bin 1362. The action of scanning a bin's barcode into which the operator just placed, or withdrew an item is referred to as "scan-verifying." At Step 1480, after receiving the scanned bin number via console manager 1315, bin manager 1310 determines whether material sorting of the serial item is complete, i.e. whether all of its component material parts have been placed into material bin 1362. If material sorting is determined to be complete then, at Step 1490, bin manager 1310 updates the job status to "Bindery." At this point, the serial item has been successfully sorted and is ready to be processed in a bindery 1365. If not all co-material parts have been placed into material bin 1362, then additional parts will have to arrive and be material sorted in order to complete material sorting of the serial item and send it to bindery 1365.

In one embodiment, after shop floor operator 1350 places the last co-material part into material bin 1362 hand-held scanner 1330 beeps to indicate that all co-material parts have been placed into material bin 1362.

Referring back to FIG. 13, once a serial item has been material sorted then the serial item can enter bindery 1365. Bindery 1365 is a location, including staff and equipment, on the shop floor where binding is performed. The term "binding", refers to actions that are performed on material parts of a serial item to create a finished product. Said actions include inter alia gluing, stapling, folding, cutting and sewing. For example, if the material parts consist of a cover and book block, then these will have to be glued, stapled or otherwise attached in the bindery. Note that some serial items, including greeting cards and calendars, have only one material part. In such cases, bindery actions such as folding may still be necessary. In some cases, for example with certain types of greeting cards, no bindery actions at all are required. In such cases material sorting is not required and the tote carrying the printed material part will bypass the bindery and be moved to the area on the shop floor where the material part will be ship sorted into a shipping bin 1372.

In bindery 1365, shop floor operator clicks a "Find Next" button on hand-held scanner 1330 and bin manager 1310 retrieves the first work item from the appropriate prioritized queue. Hand-held scanner 1330 displays the number of the material bin 1362 that holds the material parts to bind. Shop floor operator takes the material parts out of the indicated material bin 1360 and scan-verifies each material part by scanning the bar code that has been printed and is visible on the material part. After the last material part has been scan verified, bin manager 1310 releases the material bin for subsequent use. Hand-held scanner 1330 then indicates any non-printed material parts, e.g. a velum separator sheet or a non-printed book cover, to be bound together with the printed material parts. Shop floor operator retrieves any such non-printed material parts which are typically stored within bindery 1365. Shop floor operator 1350 then performs the appropriate binding task on the material parts. Next, shop floor operator 1350 scans the bound serial item and places it into tote 1355. At this point, bin manager 1310 updates the job status to "Bound." When said tote 1355 is full, shop floor operator 1350 moves said tote 1355 near to a shipping bin unit 1370 so that the bound serial items can be "ship sorted."

A shipping bin unit 1370 is a temporary storage unit that is constructed from inter alia wood, metal or plastic that is divided into a plurality of shipping bins 1372, each having a designated height, width and depth. In addition, each shipping bin 1372 displays a unique bin number, both in numeric format and in bar code format so that it can be conveniently scanned using hand-held scanner 1330. In one embodiment shipping bins 1372 are of different sizes, e.g. 1 inch, two inches, and three inches wide.

Shop floor operator 1350 performs ship sorting which is the process of taking individual bound serial items out of tote 1355 and placing them in designated shipping bins 1372. Before starting to ship sort, shop floor operator 1350 signs in to finishing server 1305. To sign in, shop floor operator 1350 uses either hand-held scanner 1330 or shop floor console 1325 to provide his operator id, and to identify his location on the shop floor. After signing in, shop floor operator 1350 may perform ship sorting.

The process of ship sorting is analogous to the process of material sorting. However, in the case of ship sorting, bound serial items are taken from tote 1355 and placed into designated shipping bins 1372 by shop floor operator 1350. A shipping bin holds all serial items that will be packaged together. Ship sorting employs a similar algorithm to that used for material sorting, described with reference to FIG. 14, with three exceptions: (1) rather than placing co-material parts into material bins 1362, shop floor operator 1350 places bound serial items into shipping bins 1372; (2) rather than wait for all co-material parts for the bin to be considered full, the algorithm waits for all serial items that will later be packaged together; and (3) rather than updating the job status to "Bound", bin manager 1310 updates the job status to "Ready-To-Ship." As with material sorting, shop floor operator 1350 withdraws a serial item and scans it. Then, bin manager 1310 uses console manager 1315 to display the shipping bin number into which to place the line item. Next, shop floor operator 1350 places the serial item into the shipping bin 1372 that corresponds to said shipping bin number and scan-verifies the shipping bin. When assigning a shipping bin 1372, bin manager 1310 takes into account the size of all serial items that must fit into the shipping bin.

Once all serial items that will be included in a package have been ship sorted into shipping bins 1372, they are ready to be packaged at a packaging station 1375. Packaging station 1375 is a physical location on the shop floor where packaging is performed.

At packaging station 1375 shop floor operator 1350 clicks a "Find Next" button on shop floor console 1325 and bin manager 1310 retrieves the first work item from the appropriate prioritized queue and displays the number of the shipping bin 1372 that contains the serial items to package. Shop floor operator 1350 takes the serial items out of the indicated shipping bin 1372. Shop floor operator 1350 then scan-verifies said shipping bin 1372 to indicate that the serial items have been taken out and that said shipping bin 1372 is now empty and can be reused. Then bin manager 1310 changes the status of the work item to "Packaged" and (1) selects the appropriate box from a plurality of different types and sizes of boxes, taking into account the size and weight requirements for each serial item to be included in the box, and (2) prints a packaging slip. If the package is to be picked up by a shipping service then a shipping label including postage is also printed. If the package is to be set aside for pickup by a "lab" then a lab label is printed. A lab is a photo lab service or other company for whom packages are batched and shipped together.

Shop floor operator 1350 then uses shop floor console 1325 to determine if any embellishments need to be added to the package. Shop floor operator 1350 retrieves any such needed embellishments which are typically stored near to packaging station 1375.

Shop floor operator 1350 completes the packaging task by (1) pulling the appropriate box as indicated by the packaging screen displayed by shop floor console 1325, (2) placing the serial items, the packaging slip, and packaging material in the box, (3) sealing the box and (4) affixing the shipping label or lab label to the box. Shop floor operator 1350 then places the package into tote 1355 which will be moved to a designated pick up area on the shop floor. At this point, bin manager 1310 updates the work item status to "Shipped."

If an error occurs during packaging an error label is printed and the order remains in the "Packaged" state. In this case, the package and the error label are set aside for shop floor manager 1340. Once shop floor manager 1340 resolves the error he scans the package again to obtain a shipping label, then affixes the label and places the package into the designated tote 1355. Bin manager 1310 then updates the work item status to "Shipped."

In one embodiment, if the package is intended for a lab then a lab label is affixed and the package is placed in a designated tote, referred to as a "lab bin." Periodically, shop floor operator 1350 uses shop floor console 1325 to scan-verify packages from the lab bin and place the packages into a box. When the box is full shop floor operator 1350 uses shop floor console 1325 to indicate to bin manager 1310 that the package is full. Shipping manger 1320 then prints a packing slip and a shipping label. Shop floor operator 1350 places the packing label inside the box, seals the box, and places the shipping label on the box. Shop floor operator 1350 then moves the box to a designated location on the shop floor. Bin manager 1310 then updates status for each of the work items that were placed in the box to "Shipped."

Figure 15:
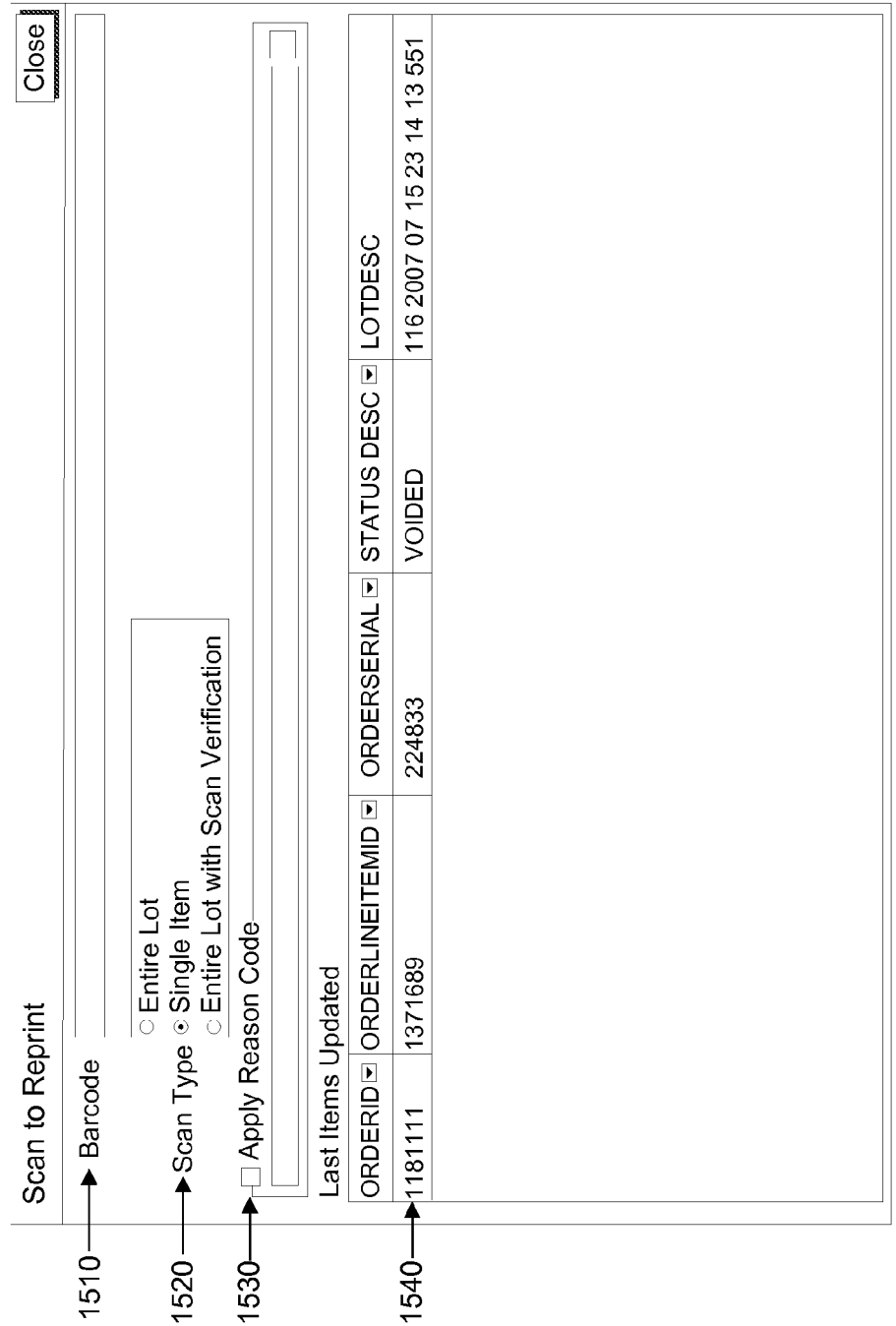
FIG. 15 is an illustrative screen capture from a shop floor console, in accordance with an embodiment of the subject invention.

Now reference is made to FIG. 15. which is an illustrative screen capture from a shop floor console, in accordance with an embodiment of the subject invention. In this example, shop floor operator 1350 selects the operation "Scan to Reprint" and the user interface screen depicted in FIG. 15 appears. Next, shop floor operator 1350 scans the barcode that appears on a serial item to be reprinted. The serial item number appears in a barcode field 1510. Shop floor operator 1350 may use a checkbox 1520 to indicate whether the entire lot, a single serial item or an entire lot with scan verification should be assigned to reprint. Shop floor operator 1350 can check a box 1530 and enter a reason code that indicates the reason why the serial item is to be reprinted. Window 1540 displays a list of previous serial items that were scanned to reprint.

Figure 16:
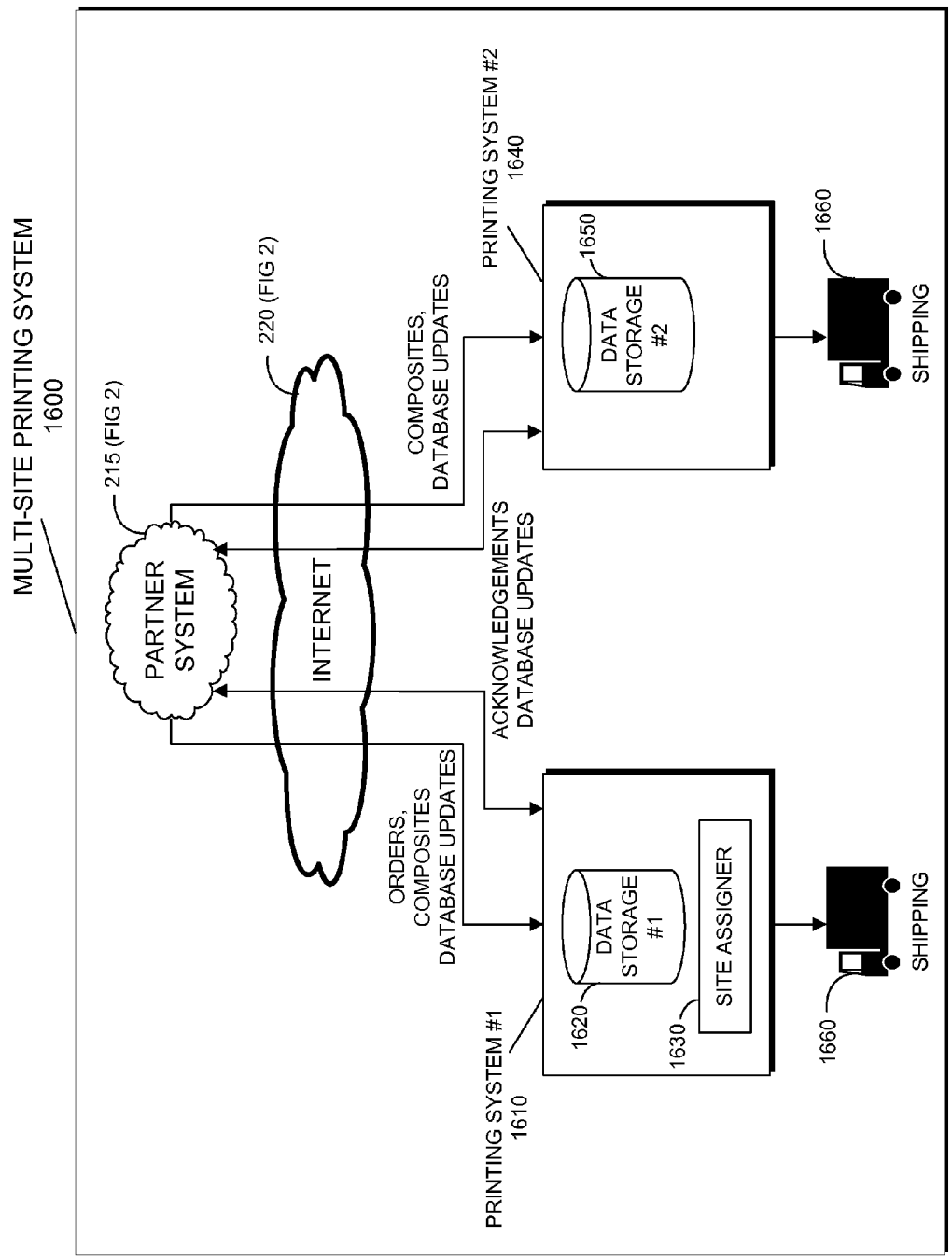
FIG. 16 is a simplified block diagram of a mufti-site printing system, in accordance with an embodiment of the subject invention.

Now reference is made to FIG. 16, which is a simplified block diagram of a mufti-site printing system, in accordance with an embodiment of the subject invention. A "multi-site printing system" enables a plurality of printing systems, each at a different location, to work together cooperatively to share and distribute the printing workload. Mufti-site printing offers several advantages including increased redundancy in case of equipment or system failure, increased capacity for peak workload and decreasing shipping times by having printing systems geographically close to the recipient. The following discussion (with reference to FIG. 16) describes only the enhanced capabilities of the "mufti-site printing system" embodiment. The mufti-site printing system embodiment incorporates all the features and functions of printing system 200 as described with reference to FIG. 2.

FIG. 16 includes two printing systems, a printing system #1 1610 and a printing system #2 1640. Printing system #1 1610 receives orders from partner system 215 (FIG. 2). To accomplish this, prepress server 225 (FIG. 2) downloads, imports, and stores each order in a data storage #1 1620 using the method described with reference to FIG. 8. A site assigner 1630 then assigns the order a print site identifier (referred to as a "site ID") that identifies the site that will rasterize, print, bind, package, and ship the order. Site, in this case, refers to either printing system #1 1610 or printing system #2 1640.

In one embodiment, site assigner 1630 automatically assigns the site ID based on the addresses of the recipients of the printed products included in the order. For example, if the majority of recipients are located in the eastern United States then the order may be assigned to printing system #1 whereas if the majority of recipients are located in the western and midwestern United States the order may be assigned to printing system #2.

In a second embodiment, site assigner 1630 automatically assigns the site ID based on the type of printer. For example, orders that contain posters may be printed by printing system #1 1610 whereas orders containing photo books may be assigned to printing system #2. 1640.

Data storage #1 1620 and data storage #2 1650 each include relational databases. Said two relational databases are synchronized using transaction replication. Transactional replication is an industry standard type of replication, provided by most commercial relational database management systems, that allows data modifications to be propagated incrementally between databases in a distributed environment.

Once a site ID is assigned to an order and the order has been imported, the rest of the workflow is identical to that described previously with reference to FIG. 2 with the exception that printing system #1 1610 only processes orders that are assigned to it, and printing system #2 1640 only processes orders that are assigned to it. For example, if printing system #2 1640 processes an order then the prepress server included in printing system #2 will download the composite images required to print the order and store them in data storage #2 1650.

The mufti-site printing system offers protection in case of a component failure in one of the printing systems. In one embodiment, if there is a component failure in one printing system, for example, in printing system #2, then any order assigned to printing system #2 1640 are reassigned to printing system #1 1610 for processing. Orders that are being processed by printing system #2 at the time of the component failure can be hafted and reprinted by printing system #1 1640. Hafting and reprinting an order that is in process can be performed as follows: (1) a printer operator such as printer operator 1170 reassigns the order's site ID to printing system #1; (2) any data associated with the order in data storage #2 1650 is replicated to data storage #1 1620; and (3) the job status is set to Reprint which puts the system into the prioritized queue of printing system #1 1610. One method for replicating data from data storage #2 1650 to data storage #1 1620 is to use a folder replication feature that is commonly available with network addressable storage (NAS) systems such as those typically used by data storage #1 1620.

It will be appreciated by those skilled in the art that site assigner 1630 may run in any server within printing system 1610 including management server 230, prepress server 225, print server 1130, or finishing server 1205. Additionally, it will be appreciated by those skilled in the art that the previously described approach to mufti-site printing can be used to share print order processing among more than two printing systems.

Dynamic Cadence

In one embodiment, referred to as dynamic cadence, work items are released for processing in accordance with control parameters that ensure that the work items processed at one step of the workflow are constrained to match the rate at which they can be processed at subsequent steps. The rate at which work items are released for processing is referred to as cadence. The process is dynamic because in a printing system such as printing system 200 the flow of work items is stochastic and the resources required to process the work items, which include equipment and people change frequently. The present invention adapts a lean manufacturing concept, referred to as Takt Time or Taktzeit, to adjust the cadence of print jobs to match the rhythm of shop floor operations.

In the embodiment described herein, dynamic cadence is applied at the "Ready to Print" state to control the cadence at which print server 1130 provides, or releases, work items, referred to at this step as print jobs, for printing. A print job, at this stage, includes one or more material parts. The objective is for print server 1130 to release print jobs for printing in priority order with a cadence that enables finishing system 1300 to process the printed work items flowing from rip and print system 1100 without work piling up on the shop floor. It may be appreciated by one skilled in art that the methods and principles described herein with respect to dynamic cadence can be equally applied at other steps in the overall printing workflow implemented by printing system 200. As described with reference to FIG. 11, the dynamic cadence functions, methods and processes described with reference to FIGS. 17-22 are implemented by a value stream manager 1132 within print server 1130 while print jobs are stored in data storage 235 which is included within or accessible by print server 1130. This embodiment refines the concept of printer cluster, as exemplified by printer cluster #1 1110 and printer cluster #2 1120 described with reference to FIG. 11.

The following terms, used to specify the dynamic cadence embodiment, have the meaning given below:

Value stream—refers to a collection of resources used within rip and print system 1100 that process selected material parts. The resources may include rip 1140, print server 1130, printer console 1150, printer 1160, printer operator 1170, external printer 1180 and any other human or machine resources used to produce the selected material parts. As an example, a value stream for calendars may be defined in which the selected material parts include all material parts used to produce all calendar SKUs and the resources include any printers, cutters, tables and other equipment necessary to print and process calendar material parts for delivery to finishing system 1300. Each material part is assigned to a single value stream. A value stream may include resources in parallel or in serial. For example, a calendar value stream may include two printers in parallel, each capable of printing the same material parts. Further a resource, e.g. a particular printer or a table on the shop floor may be assigned to multiple value streams. For example, a particular printer operator may have duties across a calendar, and a greeting card value stream.

Cycle or cycle duration—refers to a period of time during which work is performed and/or measured for a value stream. Typically a cycle is specified by operations personnel as a length of time in minutes, or hours and minutes or the like.

Impression—refers to a physical pass of a print head across a surface of a paper. Thus, in traditional four color printing in which each color is applied separately, four impressions are required to print one surface of a paper. Alternatively, in a digital press in which all colors are applied at the same time an impression is made in one pass of the printer on one surface of a page.

Max value stream cadence, or Vmax, —refers to the maximum number of items that can be produced by a value stream during one cycle. For example, a max value stream cadence might be 100 calendars per cycle for a value stream that prints calendars. The max value stream cadence is a function of the maximum number of work items that can be produced by each of its component resources or parts.

Value stream cadence, or Vc—refers to the quantity of new work items that may be processed by a value stream during one cycle. It may also be considered as the desired production rate for a cycle. In a preferred embodiment, Vc is held constant for the duration of a cycle. Value stream cadence is specified using the same units as max value stream cadence. Vc may be specified manually by an operator such as printer operator 1170 using a console such as printer console 1150 or it may be automatically estimated based on a calculation such as that described with reference to FIG. 21 below. Vc takes into account dynamic conditions including the operational state of resources such as printers, cutters and other equipment and facilities, and the availability of human operations personnel to perform operations tasks. Vc is less than or equal to the maximum value stream cadence, Vmax.

Max Press Rate, Pmax, —refers to the maximum number of items that can be printed during a period of time by particular press, or printer. Pmax is specified in impressions per minute herein but can also be expressed in other print units such as surfaces, or pages or units of time. Pmax is specified for each printer.

Current Press Rate, Pc—refers to the number of number of items that can be printed during a subsequent time interval by a press or printer. In a preferred embodiment both Pmax and Pc are specified in impressions per cycle. Pc can also be considered as the mean service rate for a press during a period of time such as a minute, a second or a cycle duration. In one embodiment, Pc, for a given press, can be expressed as:

$$Pc = P\max - Pp,$$

where Pp is the number of impressions currently assigned to the press that must be cleared before new print jobs for the next cycle can be processed by the press. For example, at the beginning of a new cycle a press may have print jobs in its own stored print queue that it received either from a previous cycle or from another value stream. Thus, the press rate, Pc, for a printer is less than or equal to the max press rate, Pmax.

One objective is to assign an optimal number of presses, k, to a value stream at the beginning of a cycle such that the sum of the press rates for each of the printers assigned to the value stream is greater than the desired value stream cadence, Vc. Otherwise put, it is desirable that:

$$Vc \leq \sum_{i=1 \, to \, k} Pc(i)$$

where Pc(i) is the current press rate for the ith press in a value stream that includes k presses, assuming the same cycle duration for Vc and Pc.

A simple example of how to calculate Pp and Pc is now given for a single press, p1. In this example, a cycle is set to 1 minute and press p1 has a max press rate, Pmax, of 600 impressions per minute. Further, in this example, there are currently 150 impressions assigned to the press by value stream V that have yet to print and 150 impressions that have been assigned to press, p1, from another value stream and which also have yet to print. Thus, there are a total of 300 impressions already assigned to press p1. Thus, for press p1

$$Pc=Pmax-Pp=600-300=300 \text{ impressions/cycle}$$

Figure 17:
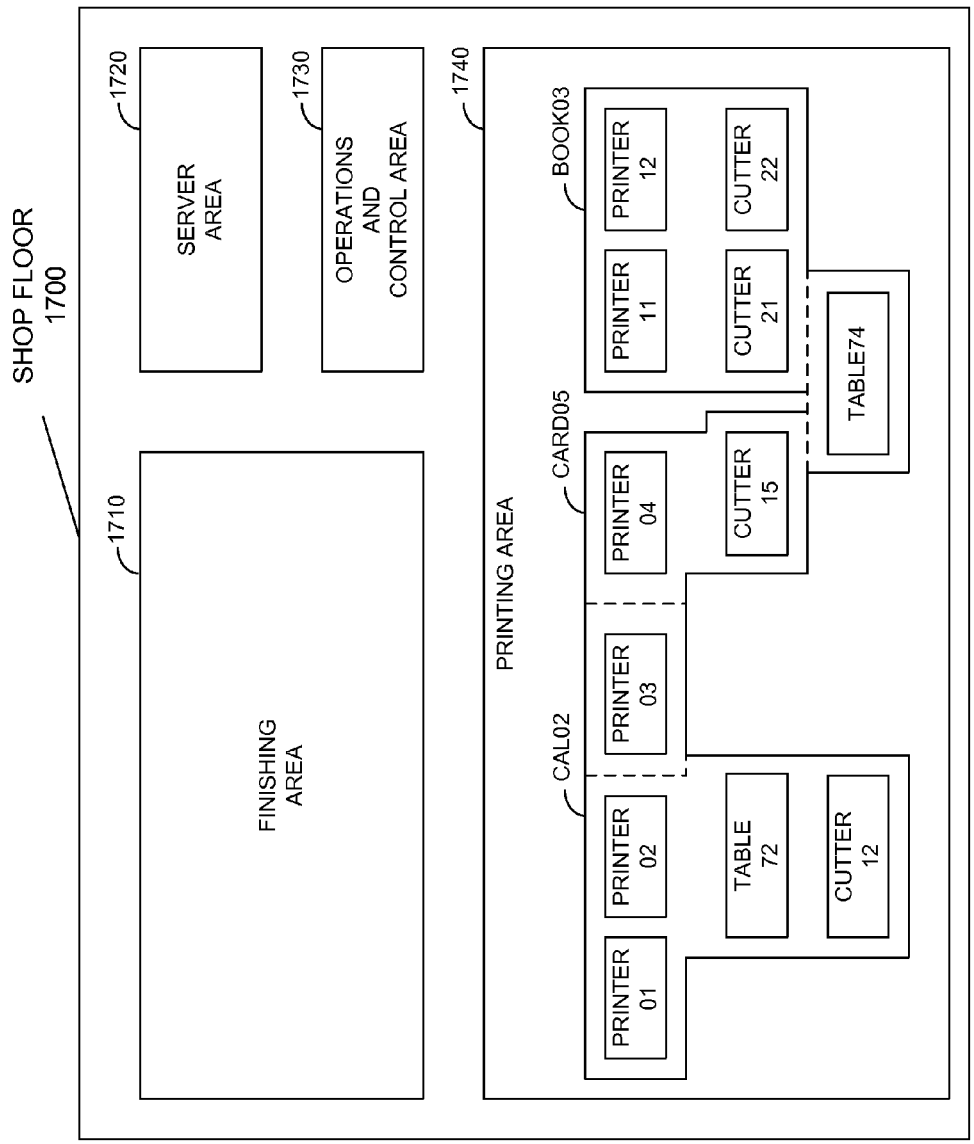
FIG. 17 is a schematic depiction of a printing system shop floor that includes three value streams, in accordance with an embodiment of the subject invention.

Now reference is made to FIG. 17, which is a schematic depiction of a printing system shop floor 1700 that includes three value streams, in accordance with an embodiment of the subject invention. Example printing system shop floor 1700 includes a finishing area 1710, a server area 1720, an operations and control area 1730, and a printing area 1740. Finishing tasks are performed in finishing area 1710, and printing tasks such as printing, cutting, and collating are performed in printing area 1740. Servers such as management server 230, prepress server 225, print server 1130, rip 1140, and finishing server 1305 are installed in server area 1720. Operations and control consoles such as printer console 1150 and management console 1335 are installed in operations and control area 1730 where they are used by operations personnel such as printer operator 1170 and shop floor manager 1340.

Example printing area 1740 depicts three value streams: CAL02, CARD05, and BOOK03. Each item of equipment shown in example printing area 1740 is assigned to at least one of the three value streams. Value stream CAL02 prints and cuts material parts used to create calendar SKUs. Shop floor equipment PRINTER01, PRINTER02, PRINTER 03, TABLE72 and CUTTER12 are assigned to value stream CAL02. PRINTER01, PRINTER02, PRINTER 03 may be capable of printing some or all of the material parts assigned to value stream CAL02. They operate in parallel, that is, a print job is typically assigned to one of the three printers for printing.

Value stream CARD05 prints and cuts material parts used to create greeting card SKUs. Shop floor equipment PRINTER03, PRINTER04, CUTTER15 and TABLE74 are assigned to value stream CARD05. PRINTER03 is assigned to both value stream CAL02 and value stream CARD05.

Value stream BOOK03 prints and cuts material parts used to create book SKUs. Shop floor equipment PRINTER11, PRINTER12, CUTTER21, CUTTER22, and TABLE74 are assigned to value stream BOOK03. TABLE74 is assigned to both value stream CARD05 and value stream BOOK03. It may be noted that none of the value streams described herein include a raster image processor (RIP) such as RIP 1140. In this embodiment, the dynamic cadence method takes as input print jobs that have already been ripped by RIP 1140 and are in the Ready_To_Print state awaiting printing.

Figure 18:
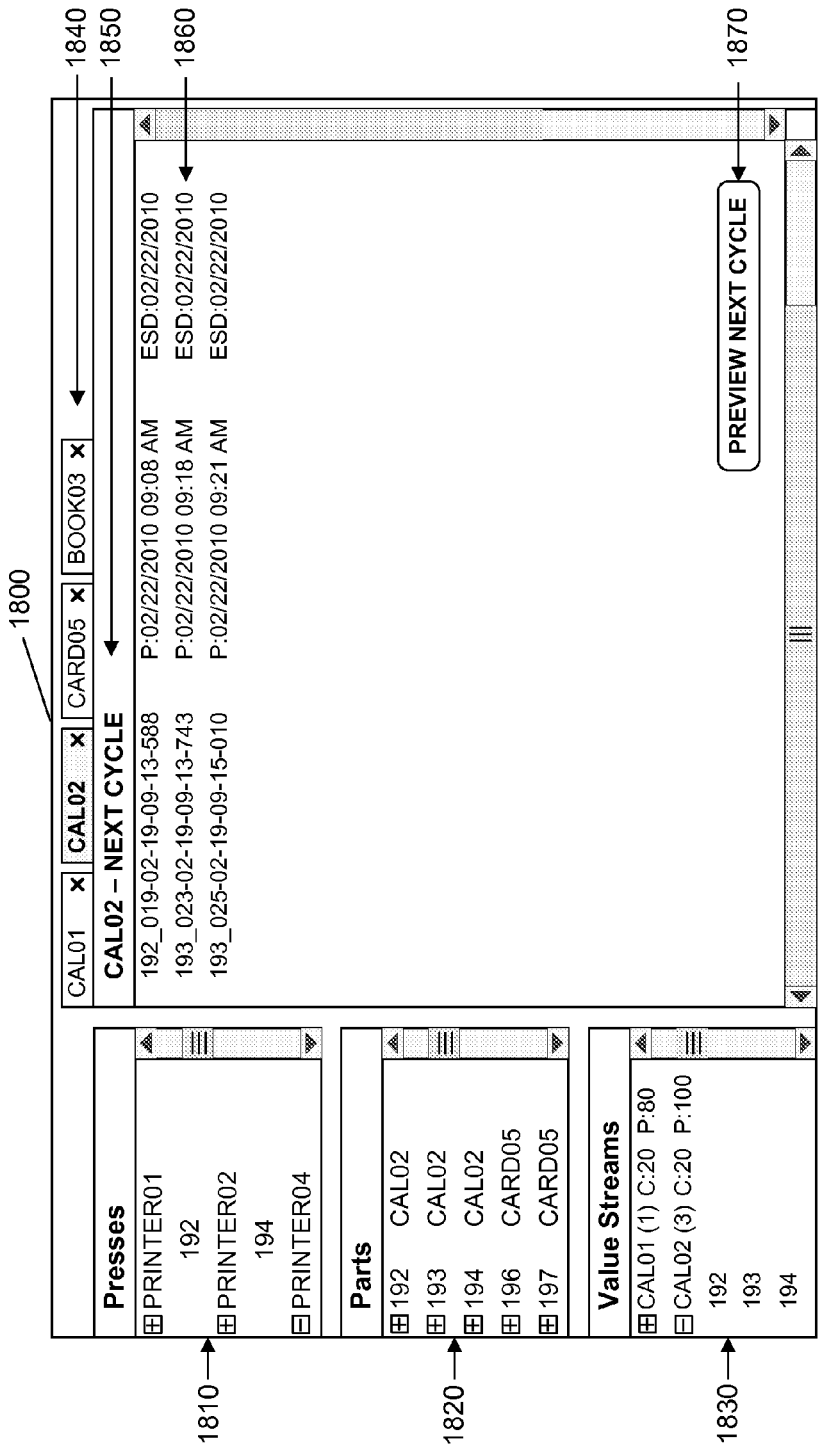
FIG. 18 is an example user interface used by a printer operator to assign presses, parts and value streams and to control the flow of print jobs, in accordance with an embodiment of the subject invention.

Now reference is made to FIG. 18, which is an example user interface used by a printer operator to assign presses, parts and value streams and to control the flow of print jobs, in accordance with an embodiment of the subject invention. Example user interface 1800 includes a press control window 1810, a material parts window 1820, a value stream window 1830 and a value stream queue 1860. Each window enables printer operator 1170, or another user, to control one or more aspects of the print process. Press control window 1810 enables printer operator 1170 to view a list of presses, also commonly referred to as printers or printing presses, and their respective operational states. In one embodiment, the operational state is identified using color wherein a press that is shown in black is operational and a press shown in red is offline, i.e. not available or operational. Printer operator 1170 uses printer control window 1810 to select one or more presses and to assign them as operational or non-operational. Further, press control window 1810 enables printer operator 1170 to view a list of material parts that can be printed by a selected press or printer.

Material parts window 1820 enables printer operator 1170 to view a list of material parts and to determine which value stream a material part is assigned to. Using material parts window 1820, printer operator 1170 can assign, or unassign a material part to a value stream.

Value stream window 1830 displays a list of value streams and enables printer operator 1170 to determine which material parts are assigned to a value stream. Using value stream window 1830, printer operator 1170 can add and delete value streams, assign or unassign material parts to a value stream, and edit properties of value streams including cycle duration and value stream cadence. Value stream window 1830 also displays summary information for each value stream. In the example depicted, three material parts are assigned to value stream CAL02, which has a cycle duration (C) of 20 minutes and a value stream cadence of 100 parts (P).

A value stream control 1840 enables printer operator 1170 to select a value stream. When a value stream is selected using value stream control 1840, the name of the value stream 1850 displays and value stream queue 1860 appears. Value stream queue 1860 displays a list of all print jobs assigned to the selected value stream. These are pending print jobs awaiting assignment, or release, to a printer. Value stream queue 1860 displays a unique print job identifier, a priority in the form of a due date and time and an estimated ship date for each print job in the queue. In the example three print jobs have been assigned to value stream CAL02 and are displayed in value stream queue 1860.

Finally, a preview control 1870 enables printer operator 1170 to preview the print jobs in the prioritized queue for the selected value stream for the next cycle.

Figure 19:
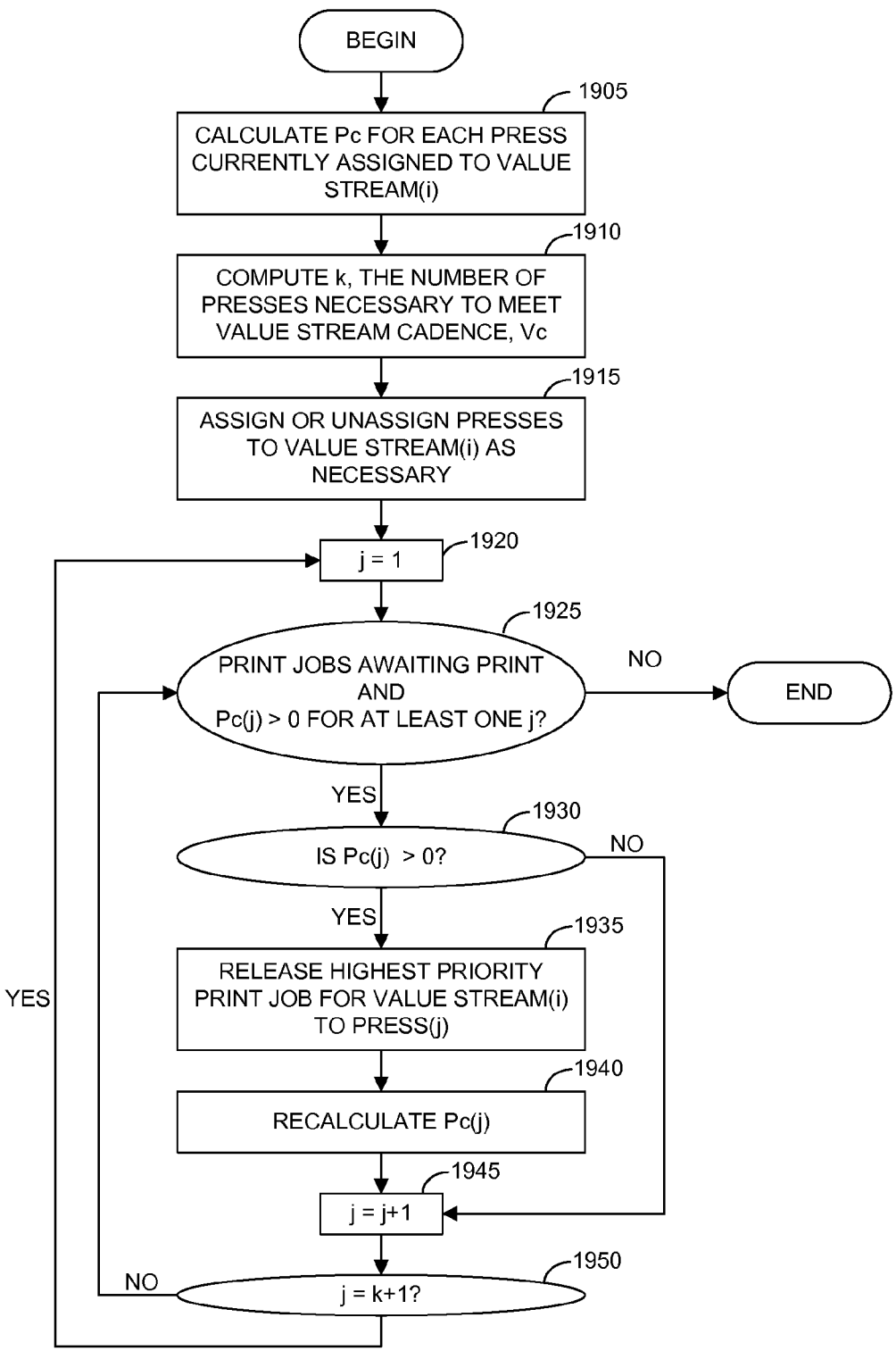
FIG. 19 is a flow diagram that describes a method that uses dynamic cadence to control the release of print jobs to a value stream, in accordance with an embodiment of the subject invention.

Now reference is made to FIG. 19, which is a flow diagram that describes a method that uses dynamic cadence to control the release of print jobs to a value stream, in accordance with an embodiment of the subject invention. The method is performed once at the close of a cycle and just prior to the start of the next cycle for each value stream. In the following discussion, the value stream under consideration is referred to as value stream(i), i.e. the ith value stream. The method is executed independently for each value stream since each value stream may have a different cycle duration and may operate independently other value streams. In a preferred embodiment, the method is performed asynchronously for each value stream using multi-threading computer programming techniques.

At step 1905 the value Pc, the press rate at the close of the current cycle, is computed for each of the presses assigned to value stream(i).

At step 1910, the minimum number of presses, k, necessary to print at the currently set value stream cadence, Vc, is calculated. A simple algorithm that accomplishes this can be stated, for the case where up to n printers are available for assignment to value stream(i) as:

```
k = 0;
For x = 1 to n {
    if ∑(j=1 to x) Pc(j) ≥ Vc {
        k = x;
        end;
    }
}
```

If, when the above algorithm terminates, x is still set to zero then n printers are not sufficient to print at rate Vc. Otherwise, k takes the final value of x, the minimum number of printers required to achieve Vc. In one embodiment, this would result in an alert being issued and displayed for printer operator 1170.

At step 1915, presses are assigned or unassigned to value stream(i) as determined by the value k calculated in the preceding step. For example, if the number of presses assigned to value stream(i) for the current cycle is m, then if k−m is greater than zero then k−m additional printers must be assigned to meet Vc. If k−m is less than zero then m−k printers can be unassigned and the value stream will still have sufficient printing capacity to meet Vc. if k−m=0 then the current number of presses assigned to value stream(i) is adequate for the next cycle. In one embodiment, if presses need to be assigned or unassigned an alert message is displayed for printer operator 1170 on printer console 1150 and printer operator uses user interface 1800 to assign or unassign presses to value stream(i). In another embodiment, presses are assigned or unassigned automatically to value stream(i).

The following steps, 1920 to 1950, essentially describe a round robin algorithm for selecting print jobs from the prioritized queue for value stream(i) and assigning them to the k printers assigned to the value stream. To begin, at step 1920 a printer counter, j, is set to 1.

At step 1925 print server 1130 determines if (1) there are print jobs awaiting print in the prioritized queue for value stream(i), and (2) if Pc(j)>0 for at least one of the j presses, i.e. if at least one of the j presses assigned to value stream(i) has printing capacity that such that at least one print job can be assigned to it for the next cycle. If neither of the two tests pass then method ends. If both tests pass, then at step 1930 a determination is made as to whether Pc(j), the current press rate for printer j is greater than zero. If not, then press j has no capacity that can be applied for the next cycle and processing continues at step 1945. If Pc(j) is greater than zero then Pc(j) can accept a new print job and processing continues at step 1935.

At step 1935 the highest priority print job in the prioritized queue for value stream(i) is released to the jth press for printing. Then, at step 1940, Pc(j) is recalculated with the newly assigned print job taken into account.

At step 1945 printer counter j is incremented by one.

At step 1950 a determination is made as to whether printer counter j is equal to k+1. If so, then processing flows to step 1920 and another round robin pass of assigning print jobs to each of the assignment printers is made. If counter j is less than k+1 then processing returns to step 1925.

It may be appreciated by one skilled in the art that this method for releasing print jobs to value streams may rely on a prioritization method such as that described with reference to FIG. 6 to first prioritize the print jobs. The present method then controls the flow of the prioritized print jobs within their appropriate value streams. This method may be used to feed work items to any step or sequence of steps in the workflow where the resources needed to perform the step or sequence of steps can grouped into a value stream. For example, dynamic cadence may be applied to the sequence of steps performed by prepress server 225, or to a sequence of steps performed by finishing system 1300.

Figure 20:
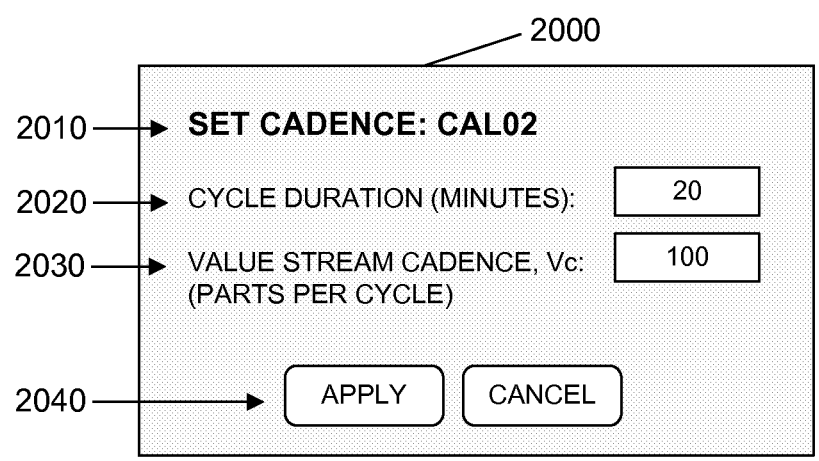
FIG. 20 is an example user interface used by a printer operator to specify dynamic cadence parameters, in accordance with an embodiment of the subject invention.

Reference is now made to FIG. 20, which is an example user interface used by a printer operator to specify dynamic cadence parameters, in accordance with an embodiment of the subject invention. Example user interface 2000 enables printer operator 1170 or other operations staff to use a printer console such as printer console 1150 to view or set a cycle duration and a value stream cadence, Vc. In this example, printer operator 1170 selects a value stream from value stream window 1830 and then uses a menu command to indicate the he/she wants to edit dynamic cadence parameters for the selected value stream. In example user interface 2000 an indicator message 2010 displays that the name of the selected value stream, CAL02. A cycle entry box 2020 indicates a currently set value stream cycle duration, specified in minutes in this example. Printer operator 1170 may edit the value in cycle entry box 2020. A value stream cadence entry box 2030 indicates the current value stream cadence and enables printer operator 1170 to view and edit the value stream cadence which in this example is specified as 100 parts per cycle. When printer operator 1170 finishes reviewing and/or making changes he/she uses an apply/cancel control 2040 to either save and apply any changes or cancel and not save any changes.

Figure 21:
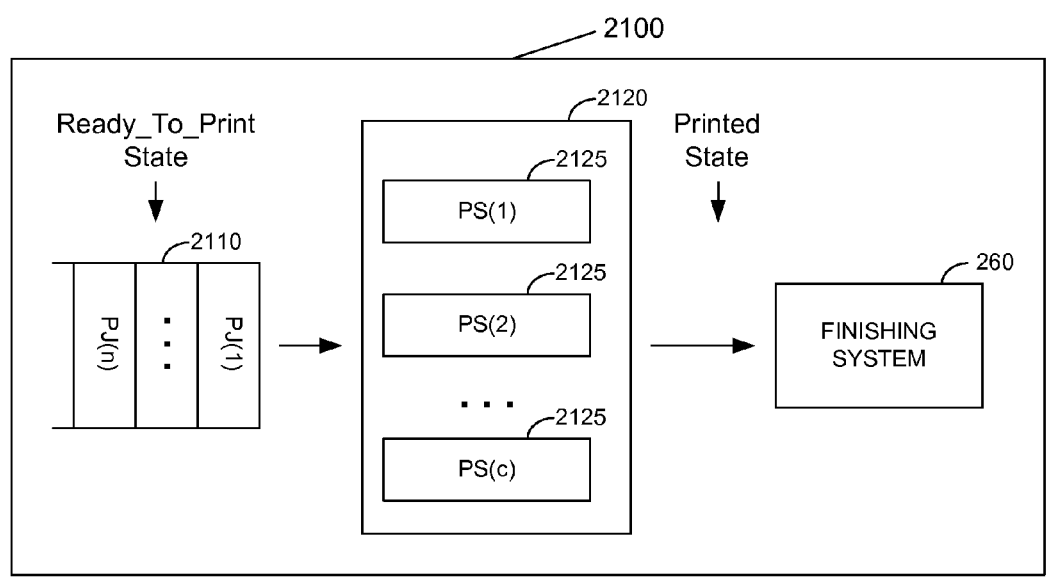
FIG. 21 illustrates a queuing model that can be used to estimate dynamic cadence parameters, in accordance with an embodiment of the subject invention.

Now reference is made to FIG. 21, which illustrates a queuing model 2100 that may be used to estimate dynamic cadence parameters, in accordance with an embodiment of the subject invention. In queuing model 2100, a value stream queue 2110 containing prioritized print jobs awaiting release for printing to a print value stream is managed by print server 1130. Value stream queue 2110 includes n print jobs denoted PJ(1), . . . , PJ(n), where PJ(1) is the highest priority print job and PJ(n) is the lowest priority. Print server 1130 releases the print jobs in value stream queue 2110 in priority order to a print value stream 2120 in accordance with a dynamic cadence method such as that described with reference to FIG. 19. The processing performed by print value stream 2120 is represented by a number, c, of parallel print service processes 2125, denoted PS(1), PS(2), . . . PS(c). Each print service process 2125 performs the complete set of operations, such as printing, folding, collating and moving the printed job to the finishing area that transform the print job from the Ready_To_Print state to the Printed state. In queuing model 2100, each print service process PS(i), is assumed to have equal capacity characterized by a mean service rate, p, measured in impressions per cycle. If, in applying queuing model 2100 to a real value stream, not all printers are of equal capacity then μ can be approximated by the mean service rate averaged across each of the parallel print service processes 2125. After a print job is processed by value stream 2120 it is provided to finishing system 260.

Queuing model 2100 is used as the basis for a queuing system mathematical model that, for example, can estimate or recommend a value stream cadence or recommend a number of presses to meet a desired value stream cadence based on steady state values. In one embodiment, the values obtained from the mathematical model are displayed using a user interface such as user interface 1800 or user interface 2000 and may be overridden by a user such as printer operator 1170. For example, if work piles up on the shop floor, then printer operator 1170 may decrease the value stream cadence for selected value streams to decrease the rate of production.

Alternatively, printer operator 1170 might choose to reduce the number of printers assigned to a value stream.

The ensuing description of the mathematical model applied to queuing model 2100 conforms to the discussion in the book *Fundamentals of Queueing Theory*, Third Edition, by Donald Gross and Carl M. Harris as it applies to M/M/c queueing models, pages 1-74. The value stream cadence for a value stream k can be expressed as a function of the expected waiting time, W(k), where W(k) is the mean time spent in value stream k. In view of Little's theorem, W(k), which will henceforth be referred to simply as W, can be expressed as:

$$W = W_q + \frac{1}{\mu}$$

where $W_q$ is the mean waiting time in value stream queue 2110 and $\mu$ is the mean service rate of a value stream service process 2125.

Queueing model 2100 can be modeled as a M/M/c queueing process using a first come first served queue discipline. Thus, arrivals to value stream queue 2110 are modeled as a Poisson distribution as are service times. And there are c identical parallel servers, each identified in queueing model 2100 as service process 2125. The M/M/c model is appropriate for a value stream that processes variable length material parts, i.e. the service times are modeled as being randomly distributed according to a Poisson distribution due to the variable size of the print jobs. In cases where a value stream handles material parts of fixed length then queueing model 2100 can be modeled as a M/D/c queueing process where the D refers to a deterministic service rate.

The following equation provides W in a M/M/c service model at steady state is given as:

$$W = \frac{1}{\mu} + \left(\frac{r^c}{c!(c\mu)(1-\rho)^2}\right)p_0, \quad \text{Equation 1}$$

where:

$\mu$ as previously stated is the mean service rate of a print service process, previously defined as Pc;

r is $\lambda/\mu$ where $\lambda$ is the mean arrival rate of print jobs into value stream queue 2110;

c is the number of servers (the c in M/M/c)

$\rho$ is r/c, and

,$p_0$ the probability that there are no print jobs in the system is given as $1-\rho$.

The equation for W can be used to deduce a variety of operational parameters, most importantly the value stream cadence or the number of printers required to meet a desired value stream cadence.

It may be appreciated that the value stream cadence, Vc, can be expressed simply as:

$$Vc = \frac{1}{W}$$

Thus, to determine the value stream cadence all that is needed are estimates for the two unknown variables: $\lambda$, the arrival rate, and $\mu$, the mean service rate for each print service process 2125. The arrival rate, $\lambda$, can be empirically determined by observing value stream queue 2110. The mean service rate, $\mu$, of service process 2125, at steady state, can be estimated as:

$$\mu = \frac{1}{n} \sum_{i=1 \, to \, n} Pc(i),$$

where Pc(i) is the value of Pc, the current press rate, averaged across a suitably large number of cycles, n. Thus, $\mu$ can be estimated as the average value of Pc. Alternatively, Pc can be determined empirically using time stamps applied when print jobs enter the prioritized queue and when print jobs are printed.

The equation for W may be used to determine the optimal number of presses to be assigned to a value stream, i.e. the value of c in the M/M/c model, given a desired value stream cadence. Since, as previously stated, W=1/Vc, given Vc it is possible to solve for c, the required number of presses. For example, Table 3, which lists steady state service times can also be used to specify a target or desired waiting time, W, to transition between any set of continuous states. In the case of queueing model 2100 the waiting time of interest is from when a print job enters the Ready_To_Print state until it enters the Printed state. For example, from Table 3 the target W for material part #002-432, a sticker, is 285−132=153 minutes. Thus, if the equation for W estimates W to be greater than 153 minutes for a value stream that processes material part #002-432 then printer operator 1170 using a user interface such as that depicted in FIG. 18 can assign one or more additional presses to the value stream.

A simple algorithm, using equation 1, the equation for W, that computes c, the required number of presses to meet a desired waiting time requirement, DW, such as that found in Table 3, is as follows:

```
For i= 1 to ∞ {
    if W(i) < DW {
        c=i;
        end;
    }
}
```

In the above algorithm, DW is the desired, i.e. not to be exceeded, waiting time and W(i) refers to equation 1, the equation for W, in which c=i. As the number of service processes 2125, represented in this approach simply as the number of presses, is incremented the value of W(i) decreases until W(i) is less than DW and the algorithm terminates and c is set to the final value of i.

It may be appreciated by one skilled in the art that alternative models, to the M/M/c model described herein may be applied to estimate value stream cadence. For example, a more refined queueing model or a simulation may be employed.

Set Value Stream Cadence as a Function of Prioritized Queue and SLA

An additional application of dynamic cadence is to set a value stream cadence for a period of time, such as an eight hour shift so as to appropriately allocate human and/or printing resources. For example, a goal might be to operate a night shift from 12 AM to 8 AM with as few printers and printer operators as necessary, while still guaranteeing that SLA requirements are met for all print jobs present in the prioritized queue at the outset of the shift. To accomplish this, it is desirable to assign a minimum number of printers to the value stream since there is a correspondence between the amount and therefore cost of human resources required to operate presses and the number of operational presses. In the extreme case, if no print jobs in the prioritized queue need to be printed during the next cycle to meet their SLA requirements then the value stream cadence may be set to 0, all printers can be unassigned, and staff can go home or be assigned to support other value streams.

Figure 22:
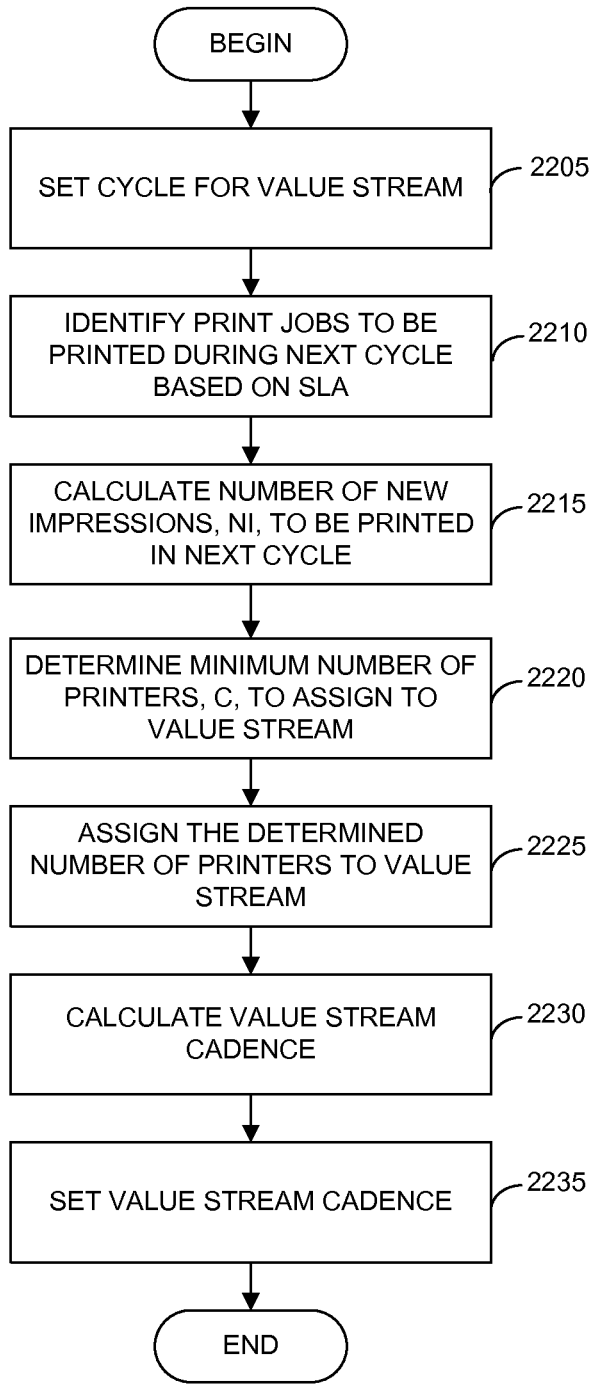
FIG. 22 is a flow diagram that depicts how to determine value stream cadence based on the SLA values of print jobs awaiting print, in accordance with an embodiment of the present invention.

Now reference is made to FIG. 22, which is a flow diagram that depicts how to determine value stream cadence based on the SLA values of print jobs awaiting print, in accordance with an embodiment of the present invention. At step 2205 the cycle duration for the next cycle of a value stream is set. It may be set by a human operator such as printer operator 1170 or it may be calculated by value stream manager 1132 and set automatically. At step 2210 value stream manager 1132 identifies the print jobs in the prioritized queue for the value stream to be printed during the next cycle in order to ensure that the print jobs meet their respective SLA requirements as represented by the priority assigned to each print job. In one embodiment, a print job, j, is identified as needed to be printed if:

priority(j)<cycle start time+cycle duration+finishing(j)

where:
cycle start time is the starting time for the next cycle,
cycle duration is the just set duration of the next cycle, typically measured in minutes,
finishing(j) is the estimated time, as given in Table 3, for the print job to move from the Printed state to the Shipped state, i.e. the estimated amount of time that will be spent in finishing system 1300, and
priority(j) is the priority, i.e. required ship time determined by the entry time into the system and the SLA for the material part in the print job with the highest priority, i.e. earliest required ship time. As discussed with reference to Table 2, the priority of a material part is the Order_Priority date and time value for the order of which the material part is a component.

Next, at step 2215 the number of new impressions, NI, from the print jobs identified in previous step in the next cycle is calculated as follows:

$$NI = \sum_{j=1 \text{ to } K} PJ(j),$$

where,
K is the total number of print jobs identified in the previous step that need to be printed in the next step, and
PJ(j) is the size in impressions of print job j At step 2220 the minimum number of printers, c, that may be assigned to the value stream for the next cycle is determined, based on the new impressions, NI, that must be printed, as calculated in the previous step and the impressions remaining to be printed, Pp, on the printers assigned to the value stream for the next cycle. The following simple algorithm can be used to determine c:

```
For i = 1 to n {
    if ( ∑_{i=1 to n} (Pmax(i) * cycle − P_p(i)) ) ≥ NI {
        c = i;
        end;
    }
}
``` where,
n is the total number of printers that are available to be assigned to the value stream,
Pmax(i) is the maximum print rate for press(i) in minutes,
cycle is the cycle duration in minutes,
Pp(i) is the remaining impressions on press i at the close of the last cycle, and
NI is the number of new impressions to be printed as calculated in the last step.

At step 2225, printer operator 1170 assigns the printers to the value stream, as determined in the previous step. Then, at step 2230, the value stream cadence is calculated simply as:

$$Vc = \sum_{i=1 \text{ to } c} (P\max(i) * cycle - P_p(i))$$

Finally, at step 2235 the new value stream cadence rate is set either by printer operator 1170 or automatically by value stream manager 1132. In this approach only the print jobs identified at step 2210 are released to the value stream during the next cycle. The remaining print jobs, whose processing can incur at least a one cycle delay and still meet the SLA requirement are held for release during a subsequent cycle. In a preferred embodiment, the print jobs identified at step 2210 are released to the value stream using the method described with reference to FIG. 19.

In reading the above description, persons skilled in the art will realize that there are many apparent variations that can be applied to the methods and systems described.

| LISTING 1 |
|---|
| `<?xml version="1.0" encoding="ISO-8859-1"?>`<br>`<Order xmlns="http://www.ipads.com/xml/iPads_Order"`<br>`xmlns:xsi="http://www.w3.org/2001/XMLSchema-instance"`<br>`CustomerID="Partner_Brand" EnvelopeID="33809" OrderID="33809"`<br>`orderDate="2007-02-12"`<br>`xsi:schemaLocation="http://www.ipads.com/xml/iPads_Order`<br>`iPads_Order.xsd">`<br>`  <Address AddressID="1">`<br>`    <firstname>Mark</firstname>`<br>`    <lastname>Gustafson</lastname>`<br>`    <address1>100 EastLake Ave N</address1>`<br>`    <address2></address2>`<br>`    <address3></address3>`<br>`    <city>Seattle</city>`<br>`    <state>WA</state>`<br>`    <postalcode>98101</postalcode>`<br>`    <country>US</country>`<br>`    <phone></phone>`<br>`    <email>mark@rpiprint.com</email>`<br>`  </Address>`<br>`  <Contact ContactID="1" AddressID="1" />`<br>`  <BillTo BillingID="1" AddressID="1"> <Invoice /> </BillTo>`<br>`  <ShipTo AddressID="1">`<br>`    <ShipMethod>GROUND</ShipMethod>`<br>`    <PackingSlip include="true" />`<br>`  </ShipTo>`<br>`  <CartItem ContactID="1" description="scenes" quantity="7">`<br>`    <PhotoBook_8by10wrap>`<br>`      <PhotoBookAttributes/>`<br>`      <PhotoBookCover>`<br>`        <PhotoBookCoverAttributes>`<br>`          <JobName Value="CoverPortrait"/>`<br>`          <JobStock Value="Black_Small_Wrap_Cover_Port_PartnerBrand"/>`<br>`        </PhotoBookCoverAttributes>`<br>`        <PhotoBookPage PartOrder="1">`<br>`          <PhotoBookPageAttributes>`<br>`            <TemplateName Value="StandardWrapPortraitCover"/>`<br>`          </PhotoBookPageAttributes>`<br>`          <Photo>` |

-continued

LISTING 1

```
        <PhotoAttributes>
          <Filename Value="cover_P24786_0002.pdf"/>
          <ImageType Value="pdf"/>
          <ElementName Value="Photo1"/>
          <CropStyle Value="StretchFit"/>
        </PhotoAttributes>
      </Photo>
    </PhotoBookPage>
  </PhotoBookCover>
  <PhotoBookBookBlock>
    <PhotoBookBookBlockAttributes>
      <JobName Value="DuplexPortrait"/>
    </PhotoBookBookBlockAttributes>
    <PhotoBookPage PartOrder="1">
      <PhotoBookPageAttributes>
        <TemplateName Value="StandardPortrait"/>
      </PhotoBookPageAttributes>
      <Photo>
        <PhotoAttributes>
          <Filename Value="page_P24786_0001.pdf"/>
          <ImageType Value="pdf"/>
          <ElementName Value="Photo1"/>
          <CropStyle Value="StretchFit"/>
        </PhotoAttributes>
      </Photo>
    </PhotoBookPage>
    <PhotoBookPage PartOrder="2">
      <PhotoBookPageAttributes>
        <TemplateName Value="StandardPortrait"/>
      </PhotoBookPageAttributes>
      <Photo>
        <PhotoAttributes>
          <Filename Value="page_P24786_0002.pdf"/>
          <ImageType Value="pdf"/>
          <ElementName Value="Photo1"/>
          <CropStyle Value="StretchFit"/>
        </PhotoAttributes>
      </Photo>
    </PhotoBookPage>
  </PhotoBookBookBlock>
  <NonPrintableMaterial>
    <NonPrintableMaterialAttributes>
      <Description Value="VelumSeparator012"/>
      <Quantity Value="1"/>
    </NonPrintableMaterialAttributes>
  </NonPrintableMaterial>
 </PhotoBook_8by10wrap>
 </CartItem>
</Order>
```

What is claimed is:

1. A method for a computer to manage print jobs in a printing system comprising:
   (i) maintaining a prioritized queue of print jobs, each print job including at least one part to be printed from one print product and a priority that corresponds to a desired ship date and time;
   (ii) identifying the print jobs in the prioritized queue to be printed during a next cycle, wherein time is divided into cycles and the length of the next cycle specified prior to the end of a previous cycle;
   (iii) determining a minimum number of printers required to print the identified print jobs during the next cycle;
   (iv) assigning the determined minimum number of printers to a print value stream, said print value stream including a number of printers capable of printing the at least one part from the at least one print product of each of the identified print jobs; and
   (v) providing the identified print jobs from the prioritized queue in priority order to the print value stream for printing.

2. The method of claim 1 wherein said print value stream includes a plurality of printers operating in parallel.

3. The method of claim 1 wherein a printer is assigned to more than one said print value stream.

4. The method of claim 1 wherein said print value stream is one of a plurality of print value streams that operate in parallel.

5. The method of claim 1 wherein each printer in said print value stream has a specified maximum print rate and wherein said providing does not exceed the specified maximum print rate of any printer in said print value stream.

6. The method of claim 5 wherein said determining the minimum number of printers is based in part on the specified maximum print rate of each printer in the print value stream.

7. The method of claim 1, wherein each print product has a designated ship date and time and said priority for a print job corresponds to the earliest designated ship date and time of any print products that corresponds to a part included in the print job, said designated ship date and time determined in part by a maximum delay, designated for the print product in a service level agreement, wherein a portion of said maximum delay is allocated to a finishing system that performs tasks required to create and ship the print product after its parts are printed, and wherein said identifying the print jobs in the prioritized queue to be printed during the next cycle identifies a print job if its priority is earlier than a cycle starting time plus a cycle duration plus the portion of said maximum delay allocated to the finishing system.

8. The method of claim 1 further comprising:
   receiving the identified print jobs from the prioritized queue;
   printing the identified print jobs; and
   assembling the printed identified print jobs into finished print products.

9. A device for managing print jobs in a printing system, comprising:
   (i) a data storage for maintaining a prioritized queue of print jobs, each print job including at least one part to be printed from at least one print product and a priority that corresponds to a desired ship date and time; and
   (iii) a value stream manager for:
      identifying the print jobs in the prioritized queue to be printed during a next cycle, wherein time is divided into cycles and the length of the next cycle is specified prior to the end of a previous cycle;
      determining a minimum number of printers required to print the identified print jobs during the next cycle;
      assigning the determined minimum number of printers to a print value stream, said print value stream capable of printing the at least one part from the at least one print product for each of the identified print jobs; and
      providing the identified print jobs from the prioritized queue in priority order to the print value stream for printing.

10. The device of claim 9 wherein said print value stream includes a plurality of printers operating in parallel.

11. The device of claim 9 wherein a printer may be assigned to more than one said print value stream.

12. The device of claim 9 wherein said print value stream is one of a plurality of print value streams that operate in parallel.

13. The device of claim 9 wherein each printer in said print value stream has a specified maximum print rate and wherein said providing does not exceed the specified maximum print rate of any printer in said print value stream.

14. The device of claim 13 wherein said determining the minimum number of printers is based in part on the specified maximum print rate of each printer in the print value stream.

15. The device of claim 9 wherein each print product has a designated ship date and time and said priority for a print job corresponds to the earliest designated ship date and time of any print product that corresponds to a part included in the print job, said designated ship date and time determined in part by a maximum delay, designated for the print product in a service level agreement, wherein a portion of said maximum delay is allocated to a finishing system that performs tasks required to create and ship the print product after its parts are printed, and wherein said identifying the print jobs in the prioritized queue to be printed during the next cycle identifies a print job if its priority is earlier than a cycle starting time plus a cycle duration plus the portion of said maximum delay allocated to the finishing system.

16. A non-transitory computer-readable storage medium storing program code for causing a computing device:
  (i) to maintain a prioritized queue of print jobs, each print job including at least one part to be printed from at least one print product and a priority that corresponds to a desired ship date and time;
  (ii) to identify the print jobs in the prioritized queue to be printed during a next cycle, wherein time is divided into cycles and the length of the next cycle is specified prior to the end of a previous cycle;
  (iii) to determine a minimum number of printers required to print the identified print jobs during the next cycle;
  (iv) to assign the determined minimum number of printers to a print value stream, said print value stream including a number of printers capable of printing the at least one part from the at least one print product of each of the identified print jobs; and
  (v) to provide the identified print jobs from the prioritized queue in priority order to the print value stream for printing.

17. A system for managing print jobs in a printing system, comprising:
  (a) a print server comprising:
    (i) a data storage for maintaining a prioritized queue of said print jobs, each print job including at least one part to be printed from at least one print product and a priority that corresponds to a desired ship date and time; and
    (ii) a value stream manager for:
      identifying the print jobs in the prioritized queue to be printed during a next cycle, wherein time is divided into cycles and the length of the next cycle is specified prior to the end of a previous cycle;
      determining a minimum number of printers required to print the identified pint jobs during the next cycle;
      assigning the determined minimum number of printers to a print value stream, said print value stream capable of printing the at least one part from the at least one print product for each of the identified print jobs;
      and
      providing the identified print jobs from the prioritized queue in priority order to the print value stream;
  (b) a print value stream for:
    (i) receiving the identified print jobs from the prioritized queue; and
    (ii) printing the identified print jobs; and
  (c) a finishing system for assembling the printed identified print jobs into finished print products.

* * * * *